United States Patent
Ohga et al.

(10) Patent No.: US 7,385,739 B2
(45) Date of Patent: Jun. 10, 2008

(54) IMAGE PROCESSING METHOD AND APPARATUS FOR COLOR CONVERSION ACCOMMODATING DEVICE NON-LINEARITY

(75) Inventors: Manabu Ohga, Kanagawa (JP); Kenichi Naito, Tokyo (JP); Hayato Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 10/238,790

(22) Filed: Sep. 11, 2002

(65) Prior Publication Data

US 2003/0053094 A1    Mar. 20, 2003

(30) Foreign Application Priority Data

Sep. 14, 2001    (JP)    ............................. 2001-280763

(51) Int. Cl.
*G03F 3/08*    (2006.01)
(52) U.S. Cl. ..................... 358/518; 358/1.9; 382/167; 345/589; 715/700
(58) Field of Classification Search ................ 358/1.9, 358/518; 715/527; 382/167; 345/589
See application file for complete search history.

(56) References Cited

U.S. PATENT DOCUMENTS

| | | | | |
|---|---|---|---|---|
| 5,416,890 A | * | 5/1995 | Beretta | 345/590 |
| 5,627,950 A | | 5/1997 | Stokes | 395/131 |
| 5,797,397 A | * | 8/1998 | Rosenberg | 600/400 |
| 5,875,260 A | | 2/1999 | Ohta | 382/162 |
| 5,943,680 A | | 8/1999 | Shimizu et al. | 707/528 |
| 6,041,136 A | | 3/2000 | Ohga | 382/162 |
| 6,236,406 B1 | * | 5/2001 | Li | 345/591 |
| 6,459,436 B1 | | 10/2002 | Kumada et al. | 345/590 |
| 6,477,271 B1 | * | 11/2002 | Cooper et al. | 382/167 |
| 6,525,721 B1 | * | 2/2003 | Thomas et al. | 345/600 |
| 6,542,634 B1 | * | 4/2003 | Ohga | 382/167 |
| 6,599,244 B1 | * | 7/2003 | Epps et al. | 600/437 |
| 2002/0057434 A1 | * | 5/2002 | Ohga | 356/406 |
| 2002/0060797 A1 | * | 5/2002 | Namikata | 358/1.9 |
| 2002/0145744 A1 | * | 10/2002 | Kumada et al. | 358/1.9 |

FOREIGN PATENT DOCUMENTS

| | | |
|---|---|---|
| EP | 0 531 891 A2 | 3/1993 |
| EP | 0 679 019 A2 | 10/1995 |
| JP | 04-284579 | 10/1992 |
| JP | 05-128224 | 5/1993 |
| JP | 07-087345 | 3/1995 |
| JP | 08-130655 | 5/1996 |

(Continued)

*Primary Examiner*—Twyler L. Haskins
*Assistant Examiner*—Jacky X Zheng
(74) *Attorney, Agent, or Firm*—Fitzpatrick, Cella, Harper & Scinto

(57) ABSTRACT

In some cases, an image that has undergone color conversion in correspondence with the output characteristics of a printing press as a target is printed using a copying machine or printer for the purpose of proof. Prior to such proof, an output device profile is generated. In this case, it is desired to easily confirm and tune the generated profile. According to this invention, tuning images to be proofed and chart images before and after color conversion are parallelly displayed as independent windows. An arbitrary color range to be tuned is selected on one of these windows, a tuning parameter is set for the selected color range, and a color conversion condition is tuned based on the tuning parameter.

19 Claims, 26 Drawing Sheets

FOREIGN PATENT DOCUMENTS

| | | |
|---|---|---|
| JP | 09-027916 | 1/1997 |
| JP | 09-135360 | 5/1997 |
| JP | 09-186905 | 7/1997 |
| JP | 09-186907 | 7/1997 |
| JP | 09-270925 | 10/1997 |
| JP | 09-326938 | 12/1997 |
| JP | 11-004353 | 1/1999 |
| JP | 11-075076 | 3/1999 |
| JP | 2000-013628 | 1/2000 |
| JP | 2000-048200 | 2/2000 |
| JP | 2000-050090 | 2/2000 |
| JP | 2000-278547 | 10/2000 |

\* cited by examiner

FIG. 2

| R | G | B | L | a | b |
|---|---|---|---|---|---|
| 0 | 0 | 0 | 0 | 0 | 0 |
| 0 | 0 | 16 | 12 | −1 | −10 |
| ⋮ | ⋮ | ⋮ | ⋮ | ⋮ | ⋮ |
| 255 | 255 | 255 | 100 | 0 | 0 |

FIG. 5
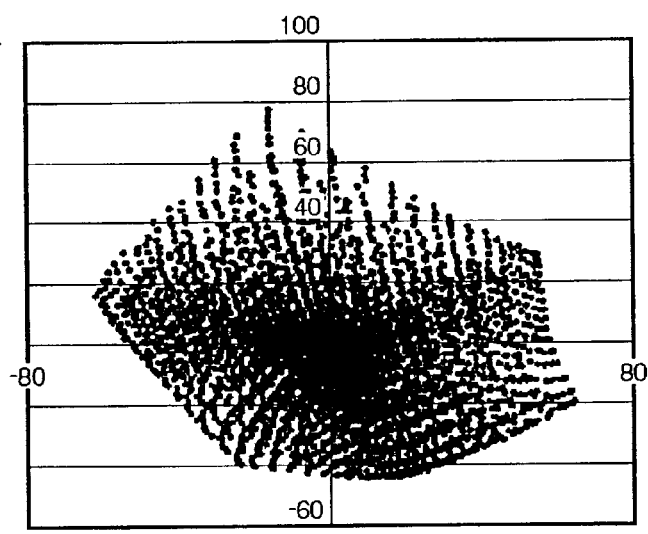
a* – b* PLOT
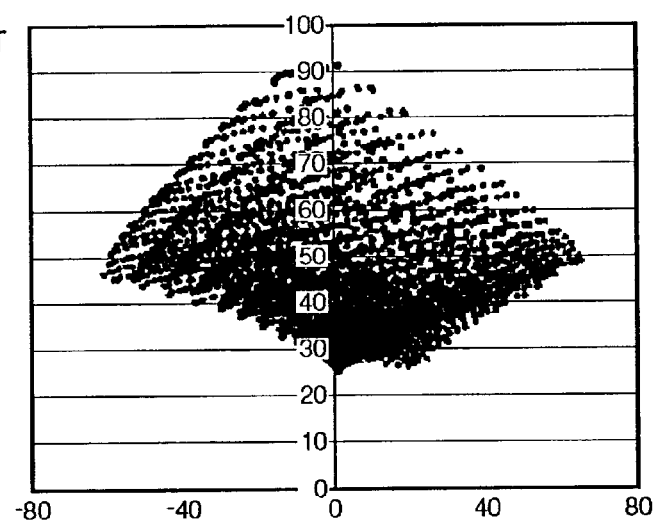
a* – L* PLOT
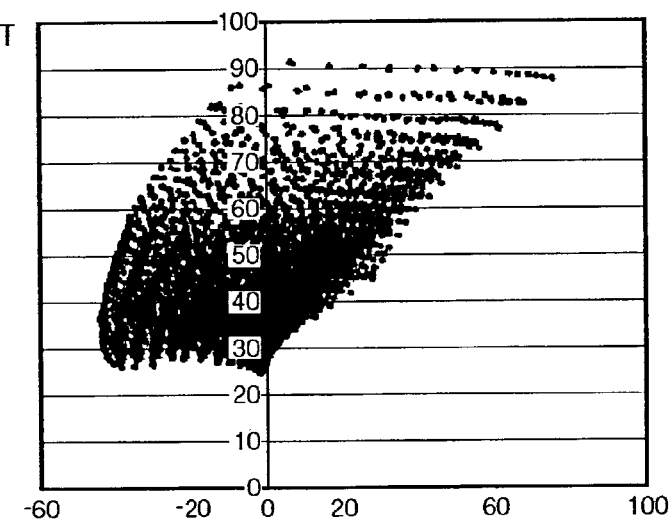
b* – L* PLOT

FIG. 21

COLOR TUNING - WHOLE SELECTION/CMYK TUNING

TUNING METHOD:
- CMYK TUNING
- Lab TUNING
- LCh TUNING

VIEW : LOWER LEFT
X-COORDINATE : 5
Y-COORDINATE : 7
ΔE : 2.2899
ΔL : −1.0254
Δa : 1.3696
Δb : 1.6187

LIGHT — DARK

C  0
M  0
Y  0
K  0

☐ CONFIRM TUNING RESULT ON IMAGE IN REAL TIME    ☐ DISPLAY SELECTED COLOR

[CONFIRM TUNING RESULT ON IMAGE]  [SET WEIGHT]  [RESET]

[OK]  [CANCEL]

FIG. 23

IMAGE PROCESSING METHOD AND APPARATUS FOR COLOR CONVERSION ACCOMMODATING DEVICE NON-LINEARITY

FIELD OF THE INVENTION

The present invention relates to an image processing method and apparatus and, for example, to a color reproduction process of a printer.

BACKGROUND OF THE INVENTION

As a method of making color correction for improving a color reproduction effect in a color reproduction process of a printer or printing press, a method of converting data on an input color space into data on an output color space by a color masking method of obtaining data on an output color space by making matrix operations of data on an input color space is prevalently used.

However, the output characteristics of a color printer or printing press exhibit strong nonlinearity. Therefore, in a global method such as the color masking method, i.e., a color correction method in which a change in element of a matrix influences the overall output color space, the characteristics of a color printer or printing press cannot be satisfactorily approximated in the entire color gamut.

SUMMARY OF THE INVENTION

The present invention has been proposed to solve the conventional problems, and has as its object to provide a profile which can accurately approximate strong nonlinear output characteristics of a color printer or printing press, and allows accurate color reproduction.

It is another object of the present invention to allow to confirm whether or not the generated profile is appropriate, and allow its easy tuning.

As a method of achieving the above object, an image processing method of the present invention comprises the following steps.

That is, there is provided an image processing method for generating a first conversion condition used to convert a device-independent color signal into a device-dependent color signal, and a second conversion condition used to convert the device-dependent color signal into another device-independent color signal, on the basis of calorimetric values of color patches output from an output device, comprising the steps of: inputting first and second image signals which depend on a target device, and converting the first and second image signals using a third conversion condition for the target device, which is used to convert a color signal depending on the target device into a device-independent color signal; displaying first and second preview images, which are respectively represented by image signals obtained by converting the converted first and second image signals using the first conversion condition, and further converting the first and second image signals using the second conversion condition; and displaying first and second original images, which are respectively represented by the first and second image signals obtained by conversion using the third conversion condition, wherein the first and second preview images and the first and second original images are displayed as different windows.

The method further comprises the steps of: selecting an arbitrary color range to be tuned; setting a tuning parameter for the selected color range; and tuning the first and second conversion conditions on the basis of the tuning parameter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of an RGB→Lab conversion table;

FIG. 5 shows an example of colorimetry results of a color patch colorimetry unit;

FIG. 21 shows an example of a CMYK color tuning dialog;

FIG. 23 shows an example of an LCh color tuning dialog;

DETAILED DESCRIPTION OF THE PREFERRED EMBODIMENTS

Preferred embodiments of the present invention will now be described in detail in accordance with the accompanying drawings.

First Embodiment

Figure 1:
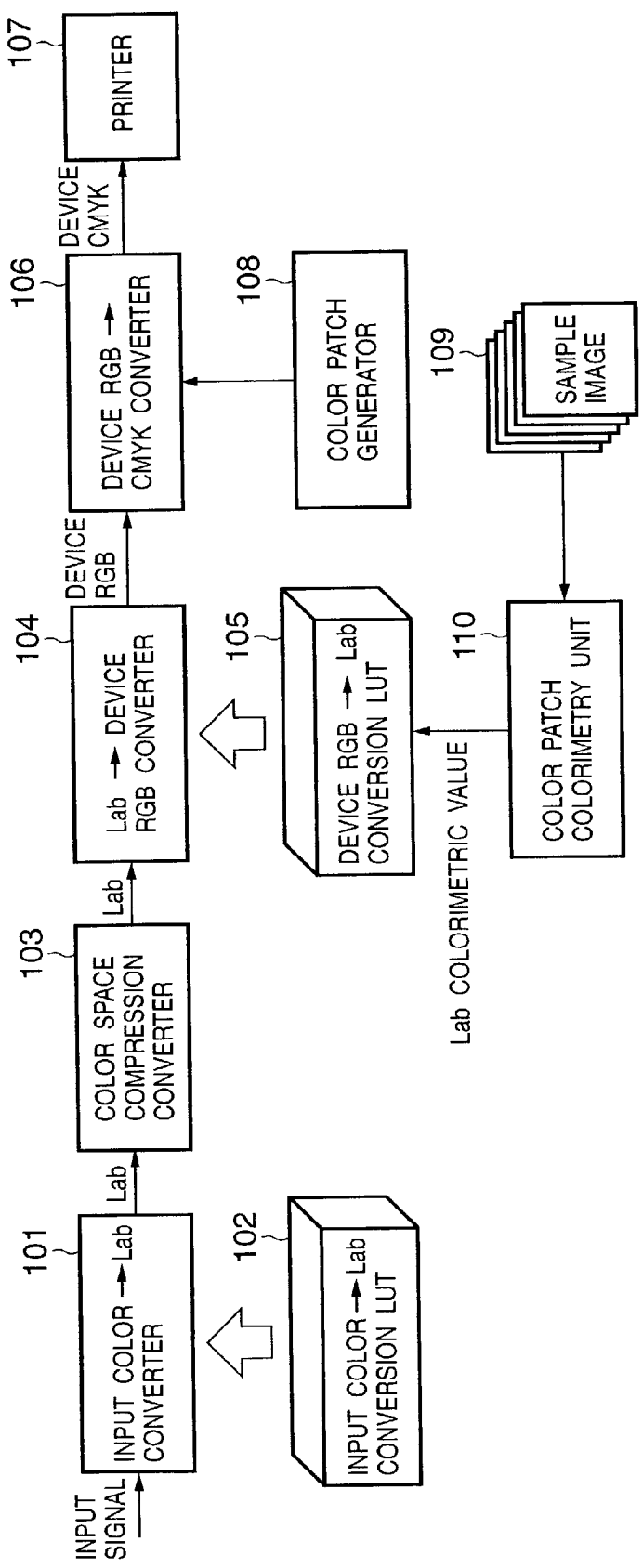
FIG. 1 is a block diagram showing an example of the arrangement of an image processing apparatus according to the first embodiment.

FIG. 1 is a block diagram showing an example of an image processing apparatus of the first embodiment.

A signal input to the image processing apparatus shown in FIG. 1 is an image signal of a color space depending on an arbitrary device and, for example, can be an RGB signal which represents an image scanned from a document by an arbitrary scanner, or a CMYK signal to be output to an arbitrary printer. When this embodiment is applied to a copying machine, an input signal is an RGB signal that represents an image scanned by a scanner. For the purpose of proof (test print, proof for correction), the input signal is a CMYK signal to be output to a printing press as a target.

Such input signal is input to an input color→Lab converter 101, and is converted into a signal on an Lab color space as a device-independent color space. This conversion is implemented by LUT conversion using an input color→Lab conversion LUT 102.

As tables of the input color→Lab conversion LUT 102, a table corresponding to the color space of the input signal must be set. For example, when an image signal depending on an RGB color space of scanner A is input, a three-dimensional input—three-dimensional output RGB→Lab conversion table which represents correspondence between RGB values that depend on the RGB color space of scanner A, and Lab values, is set as a table of the input color→Lab conversion LUT 102. Likewise, when an image signal which depends on a CMYK color space of printer B is input, a four-dimensional input—three-dimensional output CMYK→Lab conversion table which represents correspondence between CMYK values that depend on the color space of printer B, and Lab values, is set as a table of the input color→Lab conversion LUT 102.

Figure 2:
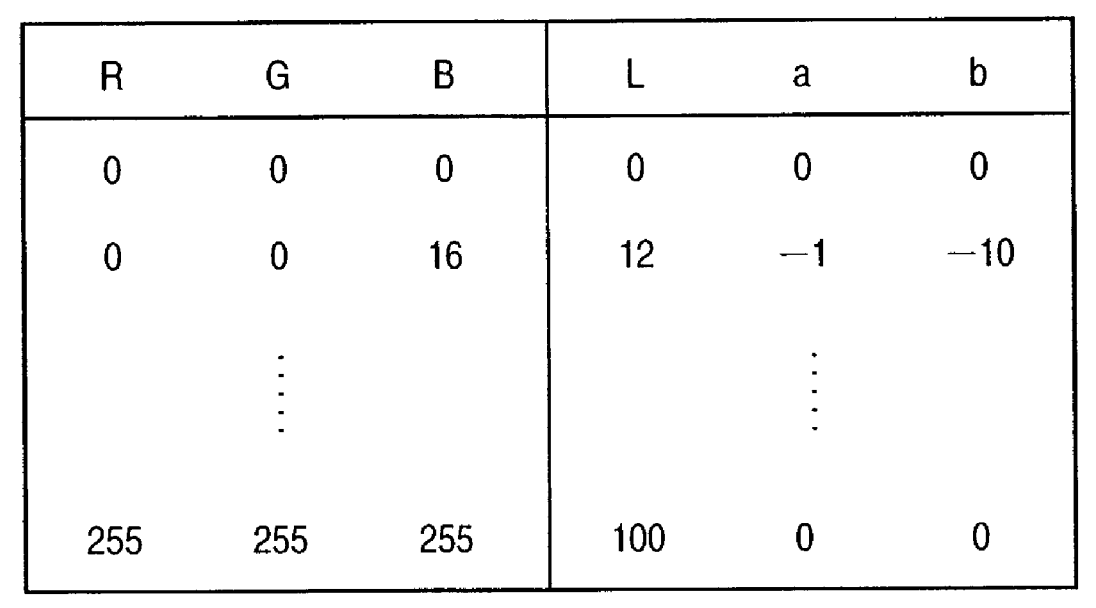

FIG. 2 shows an example of an RGB→Lab conversion table, and shows correspondence between 8-bit RGB and Lab values. Since an actual table stores Lab values using typical RGB values as addresses, the input color→Lab converter 101 extracts an Lab value near the input RGB value from the table, and makes an interpolation operation for the extracted Lab value to acquire an Lab value corresponding to the input RGB value.

An Lab signal output from the input color→Lab converter 101 is converted into a signal of a device RGB color space by an Lab→device RGB converter 104 on the basis of a device RGB→Lab conversion LUT 105. Details of this conversion process will be described later.

If the color space of the input signal is an RGB color space, its color gamut is often broader than the color reproduction range of a printer. For this reason, the Lab signal output from the input color→Lab converter 101 is mapped on the color reproduction range of a printer 107 by a color space compression converter 103 (gamut mapping), and is then input to the Lab→device RGB converter 104. As a practical method of gamut mapping, a method of executing a color space compression process in a uniform color space, as disclosed in Japanese Patent Laid-Open No. 8-130655, or the like may be used. Also, other known color space compression methods may be used.

A signal of the device RGB color space output from the Lab→device RGB converter 104 is converted into a signal of a CMYK color space, which depends on the printer 107, by a device RGB→CMYK converter 106, and the converted signal is sent to the printer 107. Various methods are available for RGB→CMYK conversion, and an arbitrary method may be used. For example, conversion formulas (1) below are used.

$$C=(1.0-R)-K$$

$$M=(1.0-G)-K$$

$$Y=(1.0-B)-K$$

$$K=\min\{(1.0-R), (1.0-G), (1.0-B)\} \qquad (1)$$

[Lab→Device RGB Conversion]

Details of the Lab→device RGB converter 104 will be explained below.

Figure 3:
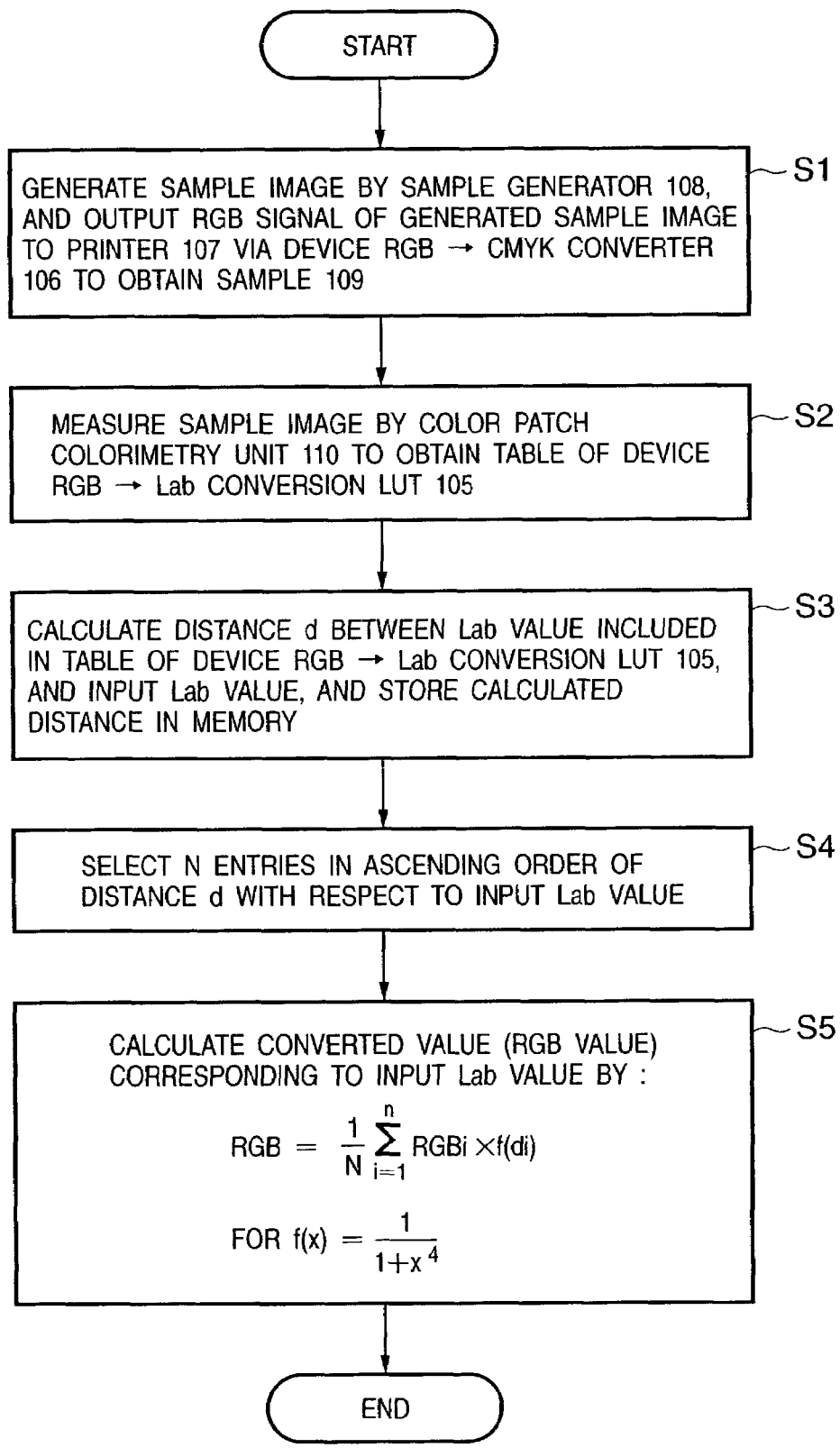
FIG. 3 is a flow chart showing the sequence for executing device RGB→Lab conversion by obtaining correspondence between device RGB values⇌Lab calorimetric values.

The Lab→device RGB converter 104 converts a signal on the basis of correspondence between device RGB values and Lab calorimetric values, which is obtained in advance. FIG. 3 is a flow chart showing the sequence for executing Lab→device RGB conversion by obtaining correspondence between device RGB values⇆Lab calorimetric values. Of course, if the correspondence between device RGB values⇆Lab calorimetric values has already been obtained, steps S1 and S2 are skipped.

Step S1

Figure 4:
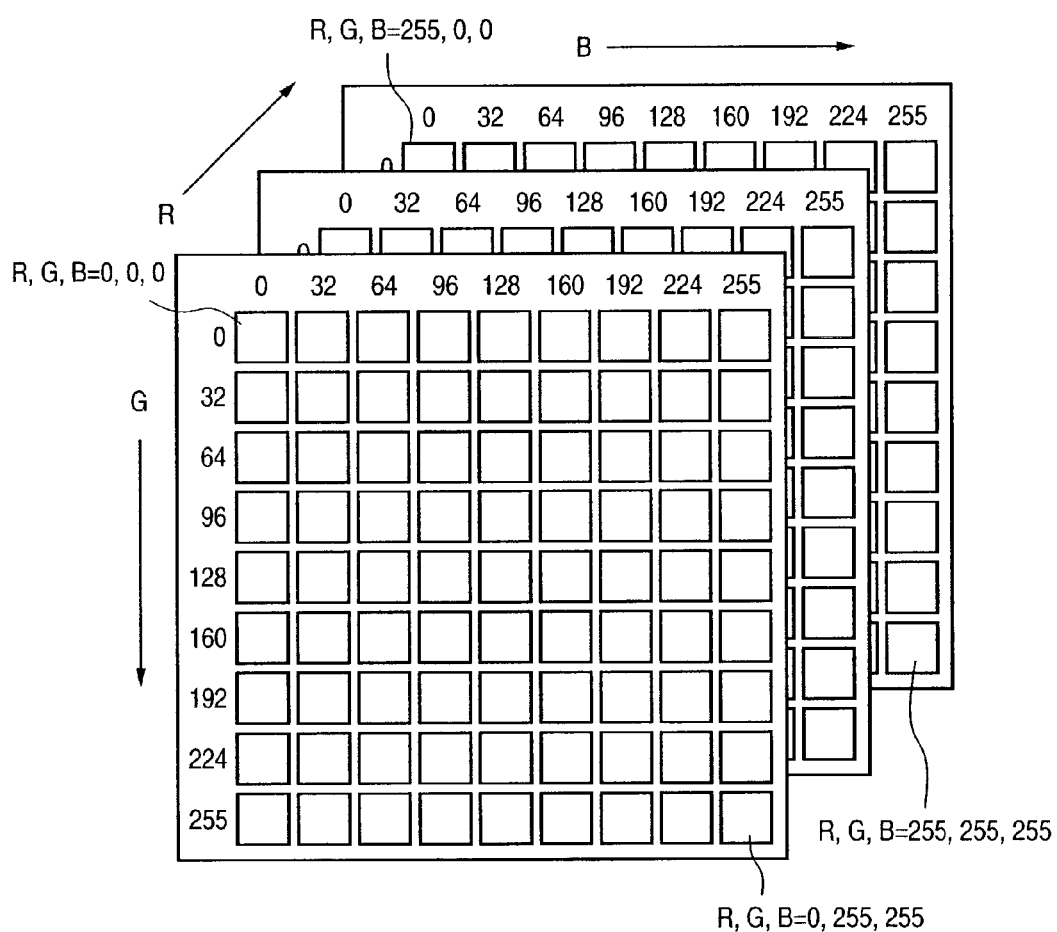
FIG. 4 shows an example of a sample image.

A color patch generator 108 generates sample images formed by a plurality of color patches, as shown in FIG. 4. The RGB signals of the generated sample images are output to the printer 107 via the device RGB→CMYK converter 106 to obtain sample images 109.

The color patch generator 108 generates sample images by equally dividing the device RGB color space. In the example of FIG. 4, the RGB color space in which R, G, and B data are respectively expressed by 8 bits is equally divided into 9×9×9 to obtain 729 patches. Generally, a color space depending on the printer 107 is a CMYK color space, but since the RGB color space can be converted into the CMYK color space via a conversion rule, the RGB color space is considered as a color space depending on the printer 107.

Step S2

A color patch colorimetry unit 110 measures the color patches of the obtained sample image 109 to obtain Lab colorimetric values of the respective color patches. The obtained Lab calorimetric values are distributed on an Lab color space, as shown in FIG. 5. With this operation, the RGB values generated by the color patch generator 108 and Lab calorimetric values measured by the color patch colorimetry unit 110 can be obtained and, hence, a table of the device RGB→Lab conversion LUT 105 can be obtained. Using this device RGB→Lab conversion LUT 105, Lab→device RGB conversion is done.

When an LUT is used, an interpolation operation such as cubic interpolation, tetrahedral interpolation, or the like as a known method is used. Such interpolation operation requires grids at equal intervals, which correspond to the input side of an LUT. In the table of the device RGB→Lab conversion LUT 105, device RGB values are arranged at equal intervals, but Lab calorimetric values are not arranged at equal intervals. For this reason, when Lab values are to be input, the table of the device RGB→Lab conversion LUT 105 does not form an LUT having grids at equal intervals. Hence, an interpolation operation that inputs Lab values cannot be simply made. Hence, Lab→device RGB conversion is made in the following sequence.

Step S3

Distances d (equivalent to a color difference based on the Lab color difference method) between Lab values included in the table of the device RGB→Lab conversion LUT 105 and input Lab values are calculated and are stored in a memory.

Step S4

Figure 6:
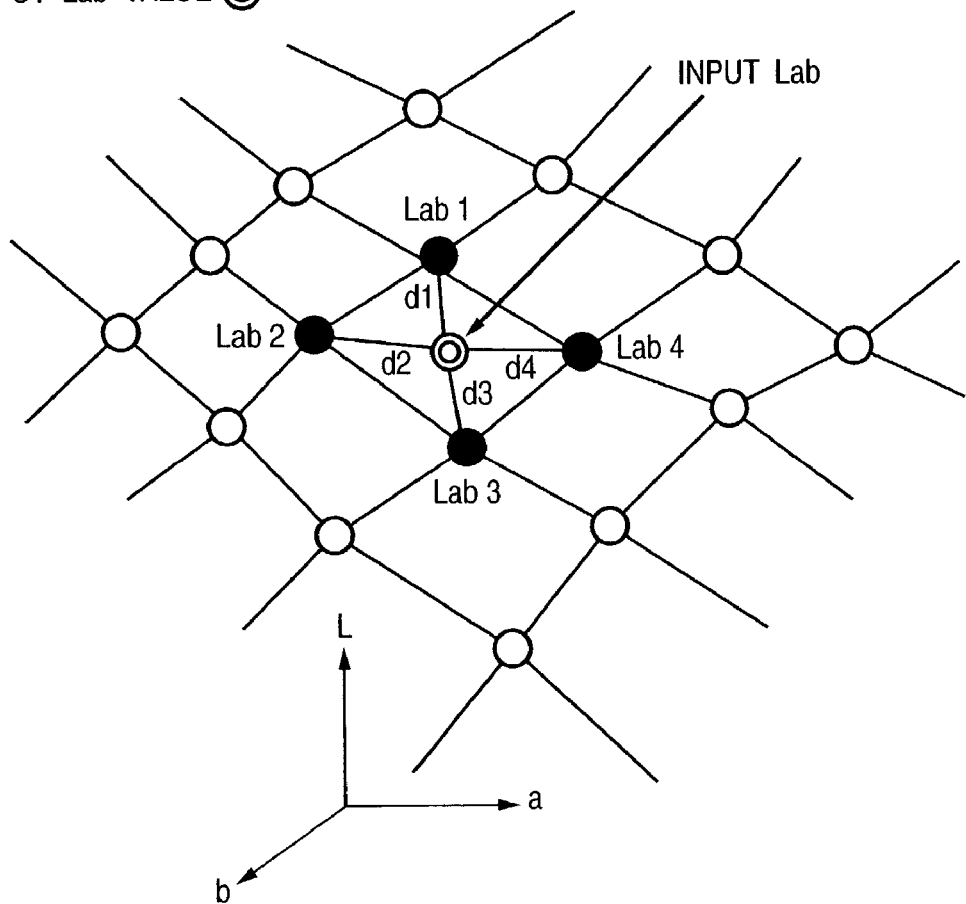
FIG. 6 is a view for explaining selection of sample points.

As shown in FIG. 6, N entries (●) are selected in ascending order of distance d with respect to the input Lab values (◎). At this time, entries are described as follows in ascending order of distance d.

| RGB value | Lab colorimetric value | Distance |
|---|---|---|
| $RGB_1$ | $Lab_1$ | $d_1$ |
| $RGB_2$ | $Lab_2$ | $d_2$ |
| $RGB_3$ | $Lab_3$ | $d_3$ |
| . | . | . |
| . | . | . |
| . | . | . |
| $RGB_N$ | $Lab_N$ | $d_N$ |

For $d_1 < d_2 < d_3 < \ldots < d_N$.

Step S5

A converted value (RGB value) corresponding to an input Lab value is calculated by:

$$RGB = (1/N) \times \Sigma_{i=1}^{N} RGBi \times f(di) \text{ for } f(x) = 1/(1+x^4)$$

Figure 7:
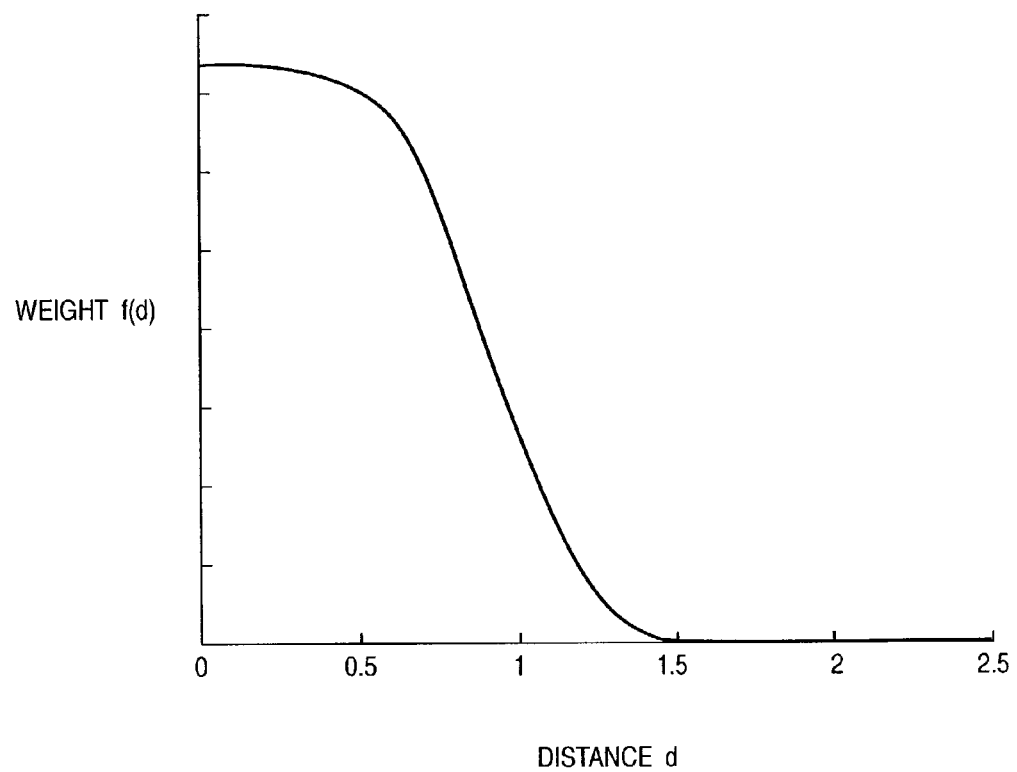
FIG. 7 is a graph for explaining a weighting function according to distance d.

Since a function f(x) has characteristics, as shown in FIG. 7, the calculation given by the above equation makes an interpolation operation by multiplying an RGB value corresponding to a closer Lab calorimetric value on the Lab color space by a larger weighting coefficient.

The number N of sample points used in the interpolation operation can be defined by a constant (e.g., 8) in the entire Lab color space. However, since calorimetric values are concentrated on a region of low lightness L*, as shown in FIG. 5, depending on the conversion method in the device RGB→CMYK converter 106, a problem may be posed if N is a constant. That is, in a region where calorimetric values are concentrated, distance d becomes very small, and if N is small, the interpolation operation is made by multiplying a few sample points by large weighting coefficients. As a result, problems such as tone jump in the device RGB color space, collapse of white balance in a low-lightness region, and the like readily occur.

Figure 8:
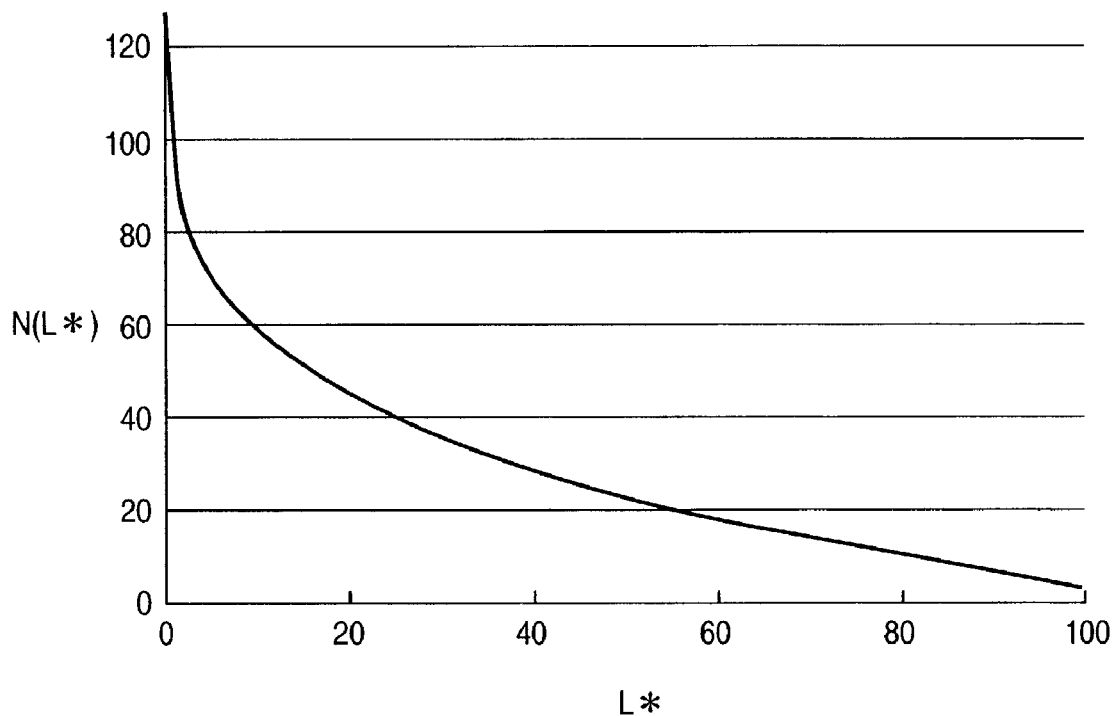
FIG. 8 is a graph for explaining a function for changing the number of sample points.

Hence, as shown in FIG. 8, when the interpolation operation is made while changing the number of sample points in correspondence with an L* value of the input Lab value, the aforementioned problems can be effectively solved. Of course, even in a high-lightness region, the number of samples used in the interpolation operation is limited, and color turbidity or the like hardly occurs. Note that an example of a function N(L*) shown in FIG. 8 is a (¼) th power function which yields 128 when L*=0, and 4 when L*=100.

When the processes in steps S3 to S5 are repeated for all input Lab values, the Lab signal can be converted into the device RGB signal.

Second Embodiment

An image processing apparatus according to the second embodiment of the present invention will be described below. Note that the same reference numerals in this embodiment denote substantially the same parts as in the first embodiment, and a detailed description thereof will be omitted.

Figure 9:
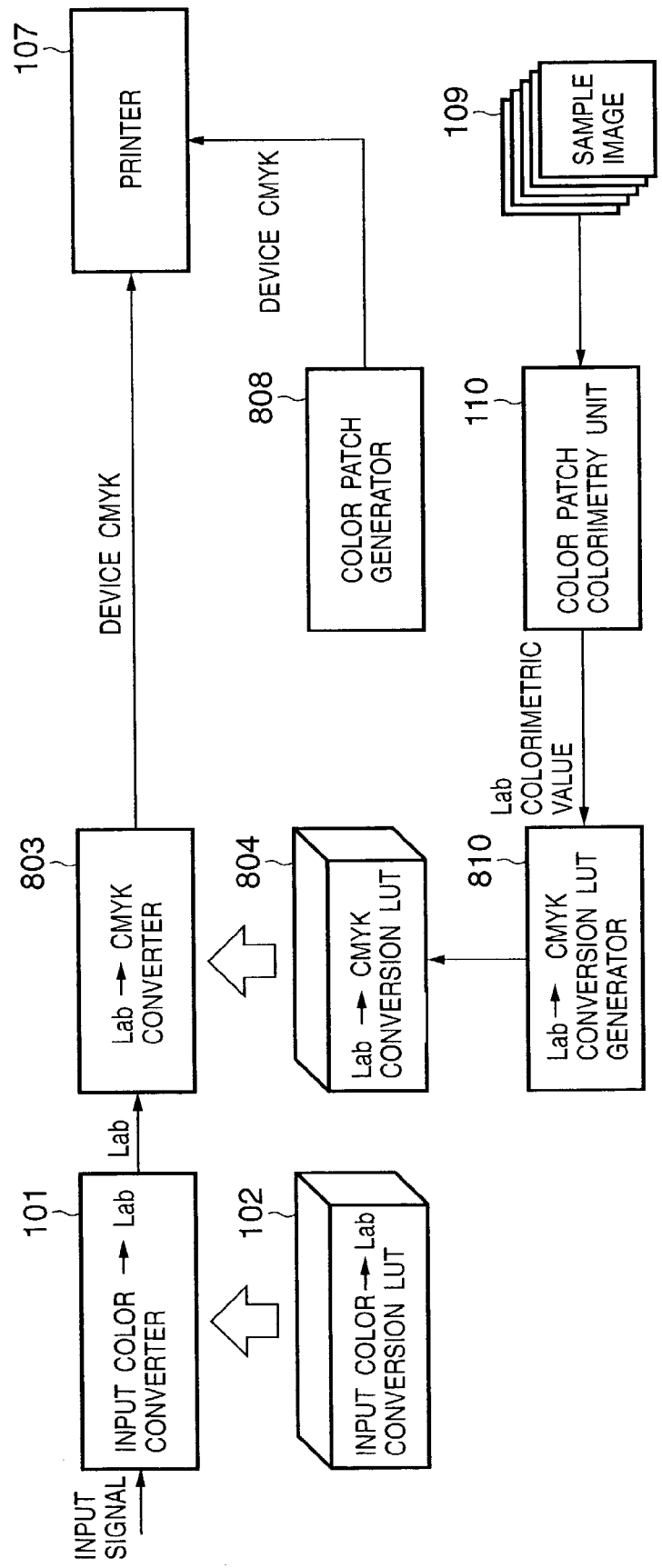
FIG. 9 is a block diagram showing an example of the arrangement of an image processing apparatus according to the second embodiment.

FIG. 9 is a block diagram showing an example of the arrangement of an image processing apparatus of the second embodiment. Unlike in the image processing apparatus of the first embodiment, the image processing apparatus of the second embodiment converts a signal of a device-independent color space into a signal of a color space of the printer 107 using an LUT as in conversion of an input signal into a signal of a device-independent color space.

An Lab→CMYK converter 803 converts an Lab signal into a signal of a CMYK color space depending on the printer 107 using an Lab→CMYK conversion LUT 804. A CMYK signal output from the Lab→CMYK converter 803 is sent to the printer 107. The Lab→CMYK conversion LUT 804 is generated as follows.

CMYK signals of sample images generated by a color patch generator 808 are output to the printer 107 to obtain sample images 109.

The color patch colorimetry unit 110 measures color patches of the obtained sample images 109 to obtain Lab calorimetric values of the color patches. Based on the obtained Lab calorimetric values and CMYK values generated by the color patch generator 808, an Lab→CMYK conversion LUT generator 810 generates a CMYK→Lab conversion LUT. Based on the generated CMYK→Lab conversion LUT, the Lab→CMYK conversion LUT 804 is generated using the same method as in the first embodiment.

For example, if an Lab value is an 8-bit signal, an L* value ranges from 0 to 255, and a* and b* values range from −128 to 127. If Lab grids are formed by dividing the respective ranges of Lab by 16 steps, a table of the Lab→CMYK conversion LUT 804 can be generated by 4913 ($=17^3$) calculations.

In the first embodiment, the Lab color space is converted into the device RGB color space using the LUT, and the device RGB color space is then converted into the CMYK color space by the arithmetic process. However, in the second embodiment, these conversion processes can be done using a single LUT, thus improving the conversion efficiency.

Third Embodiment

An image processing apparatus according to the third embodiment of the present invention will be described below. Note that the same reference numerals in this embodiment denote substantially the same parts as in the first embodiment, and a detailed description thereof will be omitted.

Figure 10:
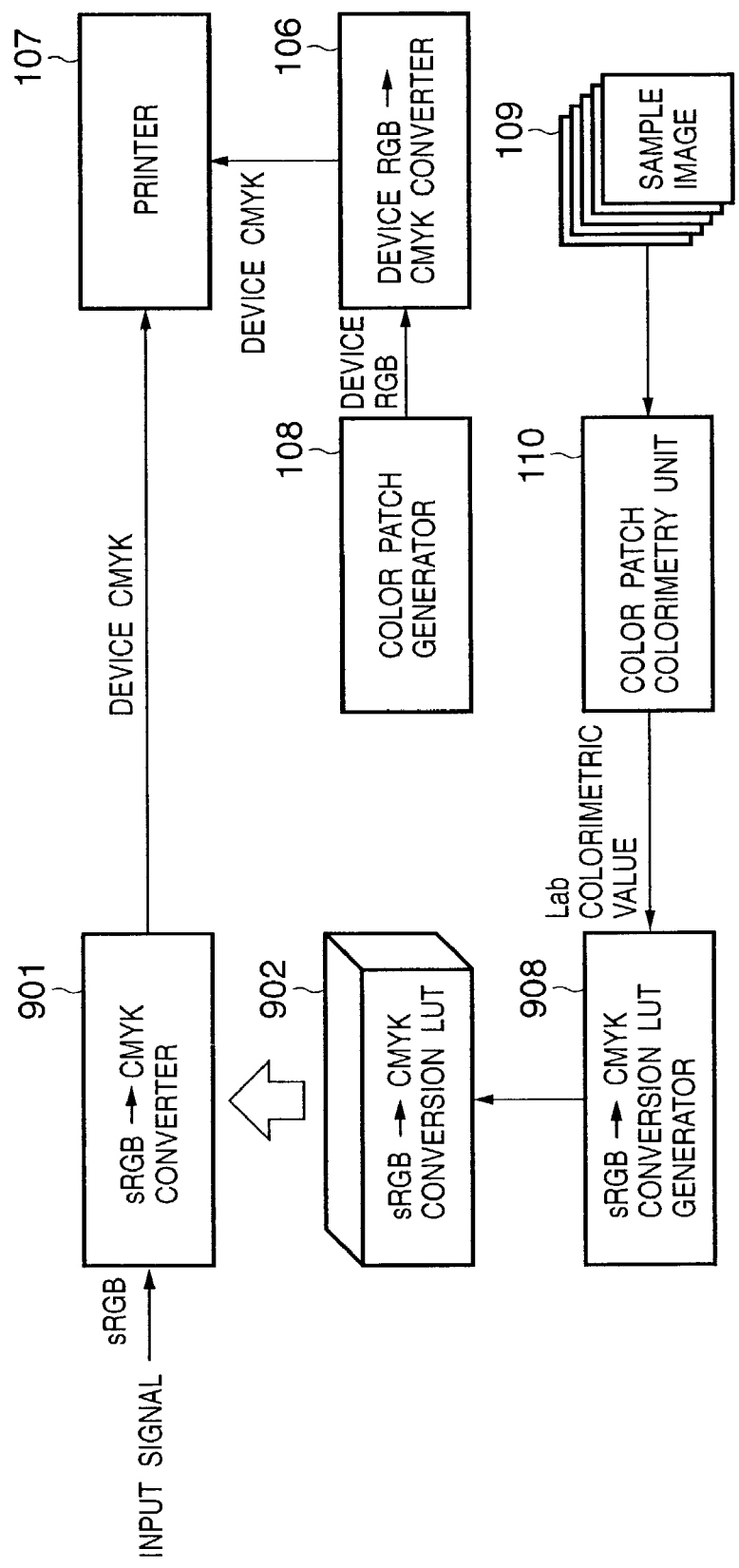
FIG. 10 is a block diagram showing an example of the arrangement of an image processing apparatus according to the third embodiment.

FIG. 10 is a block diagram showing an example of the arrangement of an image processing apparatus of the third embodiment, and this apparatus has an arrangement for receiving an input signal of an sRGB color space which will become a standard color space in the Internet. Correspondence between the sRGB color space and an XYZ color space has already been defined, and the sRGB color space can be considered as a device-independent color space. Hence, when an sRGB value is converted into an XYZ value or Lab value, and the Lab color space is then converted into a printer color space, as described above, the printer 107 can reproduce an image expressed by a signal on the sRGB color space.

Referring to FIG. 10, an sRGB→CMYK converter 901 converts an input signal of the sRGB color space into a signal of the CMYK color space which depends on the printer 107 using an sRGB→CMYK conversion LUT 902. A CMYK signal output from the sRGB→CMYK converter 901 is sent to the printer 107. The sRGB→CMYK conversion LUT 902 is generated as follows.

RGB signals of sample images generated by the color patch generator 108 are converted into CMYK signals depending on the printer 107 by the device RGB→CMYK converter 106, and the CMYK signals are output to the printer 107, thus obtaining sample images 109.

The color patch colorimetry unit 110 measures color patches of the obtained sample images 109 to obtain Lab colorimetric values of the color patches. Based on the obtained Lab calorimetric values and the RGB values generated by the color patch generator 108, an sRGB→CMYK conversion LUT generator 908 generates a table of the sRGB→CMYK conversion LUT 902.

The process of the sRGB→CMYK conversion LUT generator 908 generates a table of the sRGB→CMYK conversion LUT 902 on the basis of CMYK values obtained by executing the device RGB→CMYK conversion process described in the first embodiment for the RGB values generated by the color patch generator 108, and sRGB values obtained by executing Lab→XYZ and XYZ→sRGB conversion processes according to definition formulas for the Lab calorimetric values. For example, if an sRGB signal is an 8-bit signal, when 17×17×17 sRGB grids are formed by dividing the respective ranges of sRGB by 16 steps, a table of the sRGB→CMYK conversion LUT 902 can be generated by 4913 (=$17^3$) calculations.

According to each of the first to third embodiments described above, a color conversion method which can accurately approximate the strong nonlinear output characteristics of a color printer or printing press, and can achieve accurate color reproduction can be provided. Therefore, since color space conversion that satisfactorily reflects the characteristics of a printer or printing press is done in a device-independent color space, the printer or printing press can achieve accurate color reproduction for every input color spaces.

In each of the above embodiments, the Lab color space has been explained as a device-independent color space. However, if another uniform color space, e.g., an Luv color space is used, the same effects can be obtained.

Fourth Embodiment

The fourth embodiment of the present invention will be described below.

In each of the above embodiments, the output device profile generation method has been explained. The device value (e.g., CMYK)→Lab conversion LUT described in the above embodiment correspond to a destination profile (BtoA0) 1001D of an output device shown in FIG. 12, and the Lab→device value (e.g., CMYK) conversion LUT corresponds to a source profile (AtoB0) 1101S of an output device shown in FIG. 12

In some cases, an image that has undergone color conversion in correspondence with the output characteristics of a printing press as a target is printed using a copying machine or printer for the purpose of proof (test print, proof for correction). To execute such proof, sample image data must be supplied to an output device used in proof to make the device print sample images, and profiles must be generated based on the calorimetric values of color patches of the obtained sample images by the method explained in each of the above embodiments. Then, an image that has undergone color conversion using the generated profiles is printed by the output device.

The fourth embodiment is characterized in that the processing result based on the profiles of an output device used in proof, which are generated by the method described in each of the above embodiments, is confirmed, and the profiles can be tuned as needed. Note that the profiles to be tuned are not limited to those for proof but can be used in a normal output process (print process).

[Arrangement of Color Conversion Module]

Figure 11:
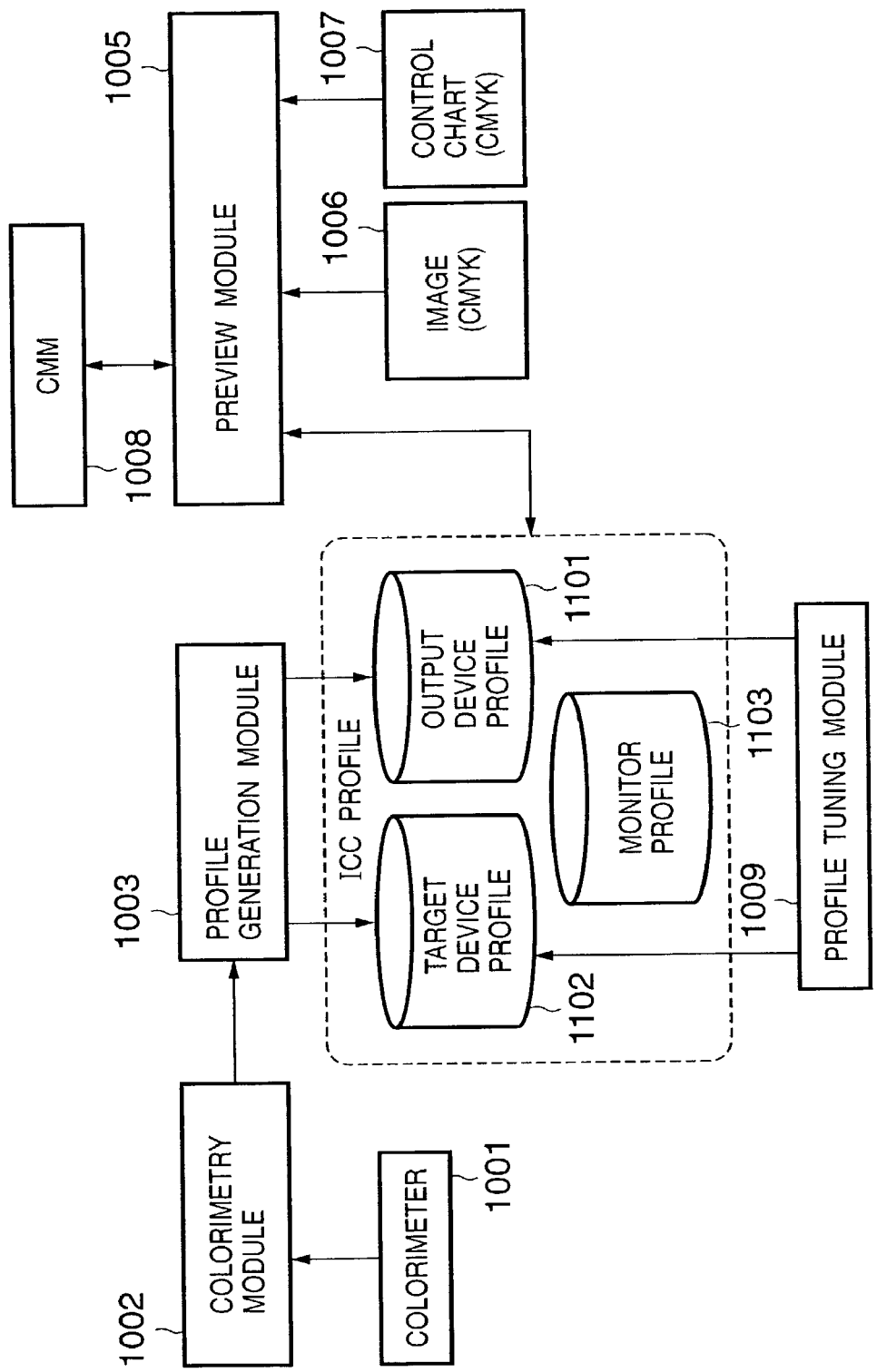
FIG. 11 is a block diagram showing an example of the arrangement of a color conversion module (CMM) according to the fourth embodiment.

An outline of an arrangement for making color conversion using profiles will be explained first. FIG. 11 is a block diagram showing an example of the arrangement of a color conversion module.

A calorimeter (spectrophotometer) 1001 and colorimetry module 1002 measure color patches of sample images (e.g., standard IT8 or 4320CMYK images). The colorimetry result is supplied to a profile generation module 1003 on-line or off-line, thus generating a profile 1001D (Lab→CMYK conversion LUT: BtoA0) and profile 1101S (device value→Lab conversion LUT: AtoB0) as output device profiles, which comply with the ICC (International Color Consortium) definitions, by the method described in each of the above embodiments.

A preview module 1005 supplies (or designates) an image 1006 to be proofed, a control chart 1007, a profile (target device value→Lab conversion LUT) 1102 corresponding to a target device, the profiles 1001D and 1101S of an output device, and a monitor profile 1103 to a color management module (CMM) 1108, and makes the CMM 1108 execute color conversion of the image 1006 and control chart 1007.

A profile tuning module 1009 tunes the output device profiles 1001D and 1101S generated by the profile generation module 1003 on the basis of a user's instruction.

Profile generation in the fourth embodiment uses the same method as in each of the above embodiments, but is characterized by allowing the user to tune the profiles. Functions in the fourth embodiment, which can improve user's usability, will be described in detail below.

[Generation of Profile]

Generation of output device profiles will be described below.

Figure 13:
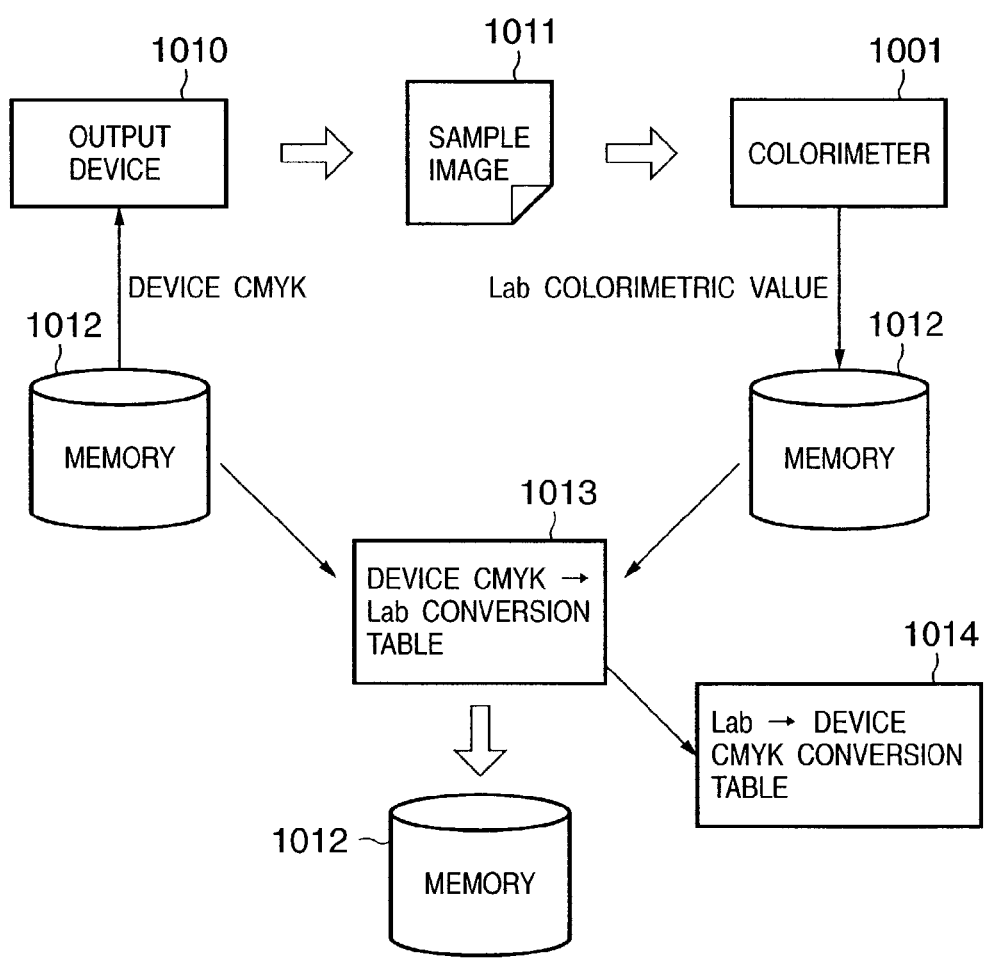
FIG. 13 is a chart for explaining a target profile generation sequence.

FIG. 13 is a chart for explaining a target profile generation sequence, i.e., a chart for explaining the process described in the second embodiment more briefly.

Device CMYK data of a sample image, which is selected by the user from a memory 1012, is supplied to an output device 1010 to make it print a sample image 1011. The sample image uses, e.g., standard IT8 or 4320CMYK images.

The calorimeter 1001 and colorimetry module 1002 measure color patches of the sample image 1011 printed by the output device 1010, and store Lab calorimetric values in the memory 1012. The profile generation module 1003 generates a device CMYK→Lab conversion table 1013 corresponding to an AtoB0 tag of an ICC profile, and stores it in the memory 1012.

In consideration of a preview function to be described later, since a BtoA0 tag is required in addition to the AtoB0 tag, the profile generation module 1003 generates an Lab→device CMYK conversion table 1014 on the basis of the device CMYK→Lab conversion table 1013. These conversion tables are finally stored in the memory 1012 as the ICC profiles of the output device 1010.

Device CMYK values in the device CMYK→Lab conversion table 1013 are arranged at equal intervals, but Lab calorimetric values are not arranged at equal intervals. Upon generating the Lab→device CMYK conversion table 1014 that receives Lab values as inputs, Lab values must be arranged at equal intervals. Hence, the Lab→device CMYK conversion table 1014 in which Lab values are arranged at equal intervals is generated based on the device CMYK→Lab conversion table 1013 using the method described in the first embodiment, and is stored in the memory 1012.

[Preview]

A preview function of making monitor display for the purpose of confirming if the generated target profile is appropriate will be described below. The preview function is launched after the profiles are generated by the aforementioned process.

Figure 12:
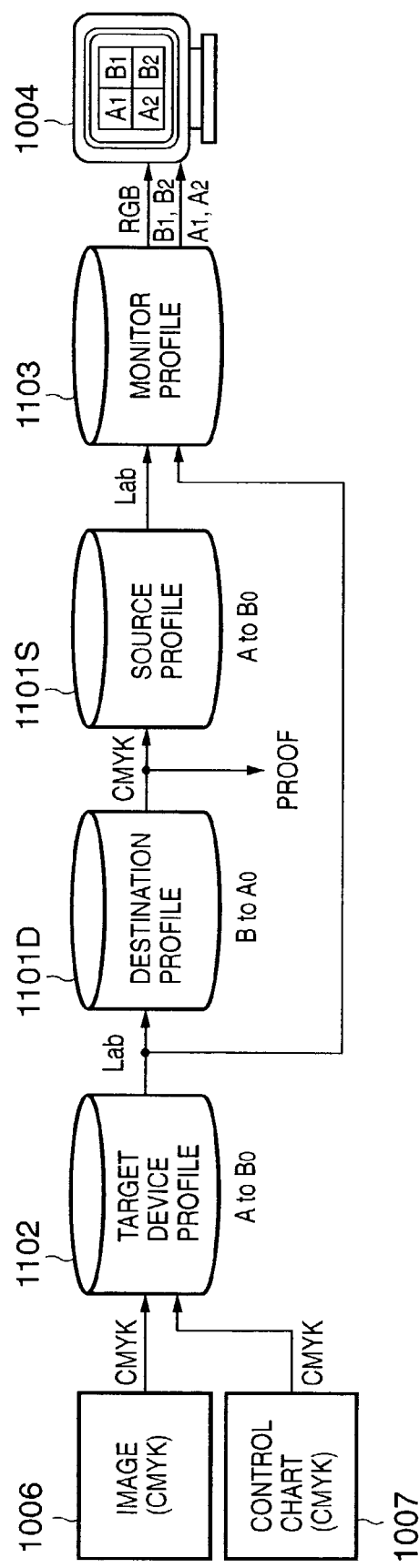
FIG. 12 is a chart showing a color conversion sequence executed by the CMM shown in FIG. 11.

FIG. 12 shows the color conversion sequence executed by the CMM 1008 shown in FIG. 11.

CMYK data of an image 1006 is converted into Lab data using the AtoB0 tag of the target device profile 1102, and the Lab data is converted into CMYK data of the CMYK color space that depends on the output device 1010 using the BtoA0 tag (destination profile 101D) of the output device profile 1101. To execute proof, this CMYK data is sent to an output device for proof.

The CMYK data of the CMYK color space, which depends on the target, is converted into Lab data again using the AtoB0 tag (source profile 1101S) of the output device profile 1101. The Lab data is converted into RGB data of a color space, which depends on a monitor 1004, using the monitor profile 1103, and the RGB data is displayed on the monitor 1004. That is, an image which will be printed by the target, i.e., a preview image B1, can be displayed on the monitor 1004, and its color reproducibility can be observed.

Furthermore, when the Lab data that has been converted using the target device profile 1102 is directly converted into RGB data using the monitor profile 1103, and the RGB data is displayed as an original image A1 on the monitor 1004, the preview image B1 which has undergone color conversion using the output device profile 1101 and the original image A1 (an image that the target device will output) which does not undergo any conversion can be observed and compared on the monitor 1004. Therefore, whether or not the generated output device profile 1101 is appropriate can be confirmed by observing and comparing the two images.

Also, as for CMYK data of the control chart 1007, a preview chart B2 and original chart A2 are displayed on the monitor 1004 in the same sequence as the image 1006.

Figure 14:
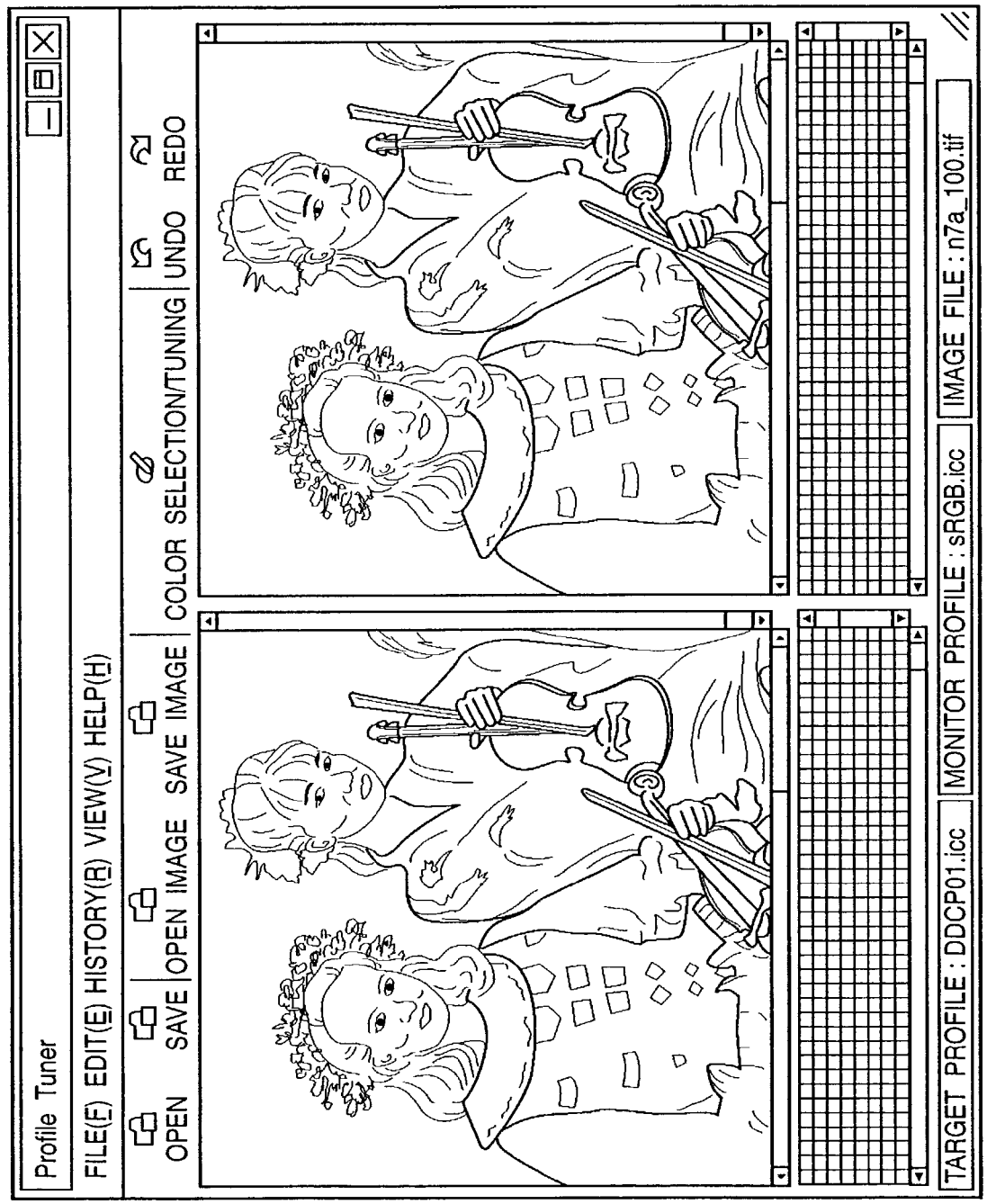
FIG. 14 shows an example of a preview window displayed on a monitor shown in FIG. 12.

FIG. 14 shows a basic example of a preview window displayed on the monitor 1004 and, for example, the original image A1 and preview image B1 are respectively displayed on the upper left and upper right windows. Also, the original chart A2 and preview chart B2 are respectively displayed on the lower left and lower right windows. That is, in FIG. 14, an upper left tuning image view shows the original image A1; an upper right tuning image view, the preview image B1; a lower left chart view, the original chart A2; and a lower right chart view, the preview chart B2. These image and chart views are displayed as independent windows.

In this manner, on the preview window, the original and preview images and charts of the tuning image 1006 and control chart 1007 are respectively displayed as independent windows. Hence, the user can use an arbitrary image as the tuning image 1006 independently of the control chart 1007.

Note that FIG. 14 shows an example in which the right and left tuning image views and chart views respectively have the same window sizes. However, these views can have arbitrary window sizes by dragging the center of the two windows using a mouse or the like.

When the user changes a zoom ratio setup on the upper left position of the preview window, the zoom ratios of the original and preview images change together. On the other hand, when the user scrolls one tuning image view or chart view, the other tuning image view or chart view scrolls synchronously. That is, the upper left positions of the two tuning image views always match an identical position on the image 1006, and those of the two chart views always match an identical position on the control chart 1007. Furthermore, while the user locates the mouse cursor on one tuning image view or chart view and holds down a mouse button, the mouse cursor is displayed at the corresponding position on the other tuning image view or chart view.

In this manner, since the tuning image views and chart views displayed as independent windows do not scroll synchronously, the user can easily compare the image 1006 and control chart 1007.

With the aforementioned user interface of the preview window, the user can easily observe and compare details of the two tuning images and two control charts.

[Tuning of Profile]

Tuning of the output device profiles will be explained below and, especially, its user interface will be described in detail.

The profile tuning module 1008 shown in FIG. 11 tunes the output device profiles 1001D and 1101S generated by the profile generation module 1003 on the basis of a user's instruction. In the example of FIG. 13, the device CMYK→Lab conversion table 1013 and Lab→device CMYK conversion table 1014 as the profiles of the output device 1010, which are stored in the memory 1012, are tuned.

In tuning of the profiles, when the user determines as a result of confirmation on the preview window that the generated target profiles are not appropriate and must be further tuned, he or she clicks a color to be tuned on one of the original tuning image view, preview tuning image view, original chart view, and preview chart view on the preview window using the mouse, thus designating the color to be tuned.

Note that the color to be tuned arbitrarily designated by the user is not always present on a grid of the color space which forms the LUT of the output device profile. Therefore, in order to determine a grid to be tuned, an appropriate range on the color space must be set as a range to be tuned.

Hence, when the user selects "color selection/tuning" on a tool bar of the preview window so as to make detailed setups of the color range to be tuned and tuning method, a color selection/tuning command is executed accordingly, and a color selection dialog is superimposed on the preview window. Note that the color selection dialog is also displayed by double-clicking the color to be tuned on the preview window as in menu selection.

Color Selection Dialog

The color selection dialog will be explained below.

The color selection dialog includes a whole selection dialog, gamut selection dialog, and spot selection dialog depending on designation of its selection method. Immediately after the color selection/tuning command is executed, the whole selection dialog is displayed as a default, but the gamut selection dialog will be explained first for the sake of simplicity.

Figure 15:
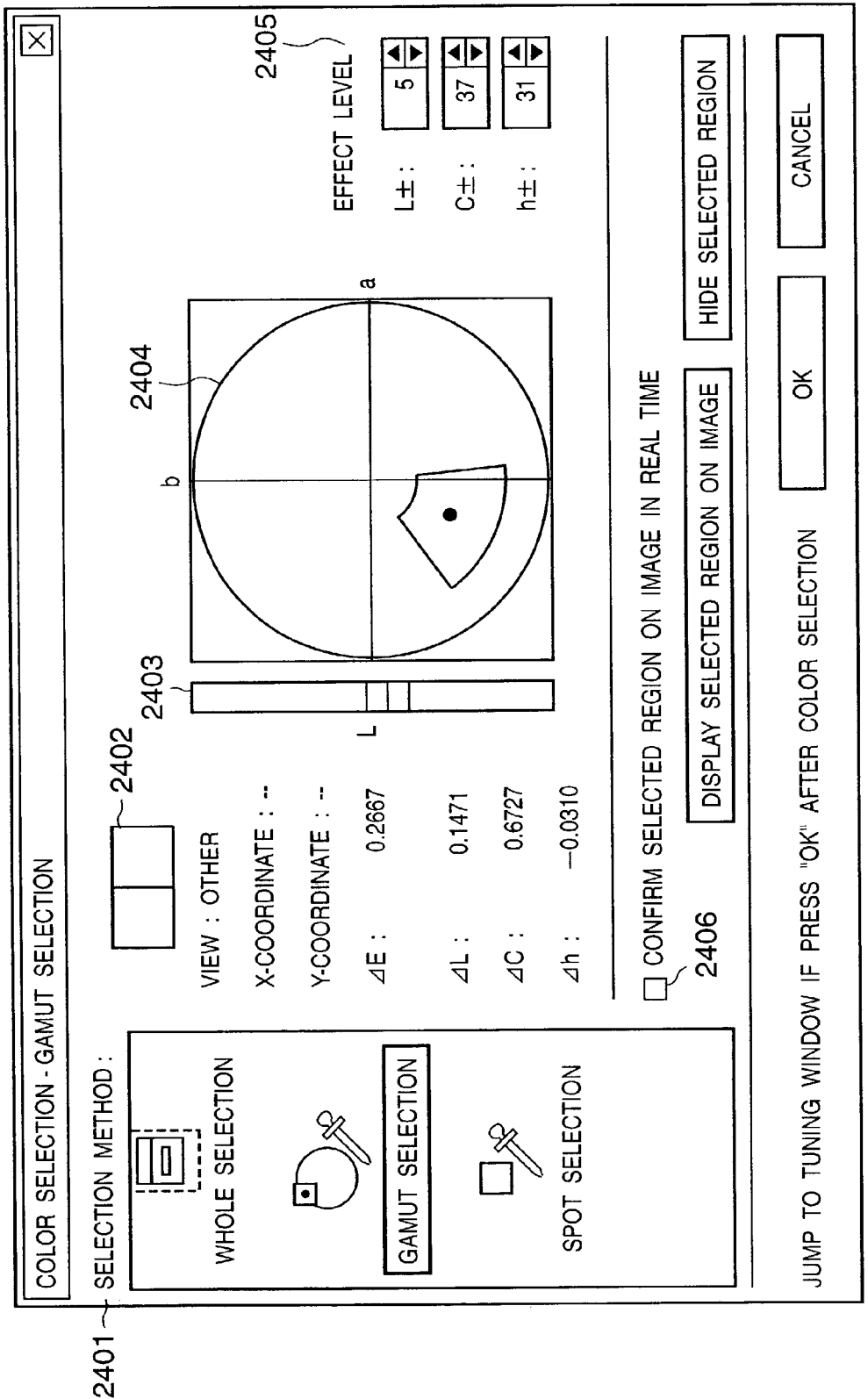
FIG. 15 shows an example of a gamut selection dialog.

FIG. 15 shows a dialog when "gamut selection" is set as a selection method 2401. "Gamut selection" is a method that allows to set a tuning range in consideration of hue by setting a fan-shaped region, which has the color to be tuned designated by the mouse on the Lab color space and is expressed by LCh, as the range to be tuned.

In FIG. 15, reference numeral 2402 denotes a color point, which displays the color to be tuned designated by the mouse. The left field of the color point 2402 indicates the color on the original image and original chart, and the right field indicates that on the preview image and preview chart. "View" is an item that indicates by its position a view where the color to be tuned is designated on the preview window. That is, if "view" is "upper left", it indicates that the color to be tuned is designated on the original image view. "X-coordinate" and "Y-coordinate" are items which indicate the position of the color to be tuned on the view indicated by the "view" item as X- and Y-coordinate values. Note that the X- and Y-coordinate values do not display any significant values when the color to be tuned is designated on the chart view. "ΔE" is an item which indicates the color difference between the original and preview image views. "ΔL", "ΔC", and "Δh" are also items which respectively indicate the differences of L, C, and h values of the color to be tuned between the original and preview image views.

Reference numeral 2403 denotes an L point, which displays the position of the color to be tuned on a color balance that indicates the degree of luminance. Likewise, reference numeral 2404 denotes an ab point, which displays the position of the color to be tuned on a color wheel that expresses hue and saturation as color gradation on a and b axes. Reference numeral 2405 denotes items which are used to set the effect levels of tuning on L, C, and h values to have the color to be tuned as the center. The fan-shaped tuning range in the Lab color space is set based on the effect level.

On the gamut selection dialog shown in FIG. 15, the color to be tuned is indicated by a dot on the color wheel of the ab point 2404, and a tuning range according to the effect level is displayed in a fan shape to have that dot as the center. Likewise, the L point 2403 displays lines that indicate the tuning range according to the effect level above and below a line that indicates the color to be tuned. On the gamut selection dialog, the tuning range displayed on the ab point 2404 or L point 2403 can be directly enlarged/reduced using the mouse. In this case, the items of the effect level 2405 are updated in correspondence with the change in tuning range.

Note that the color selection dialog can be directly displayed from the tool bar without designating the color to be tuned on the preview window, and the color to be tuned can be set on that dialog.

Figure 16:
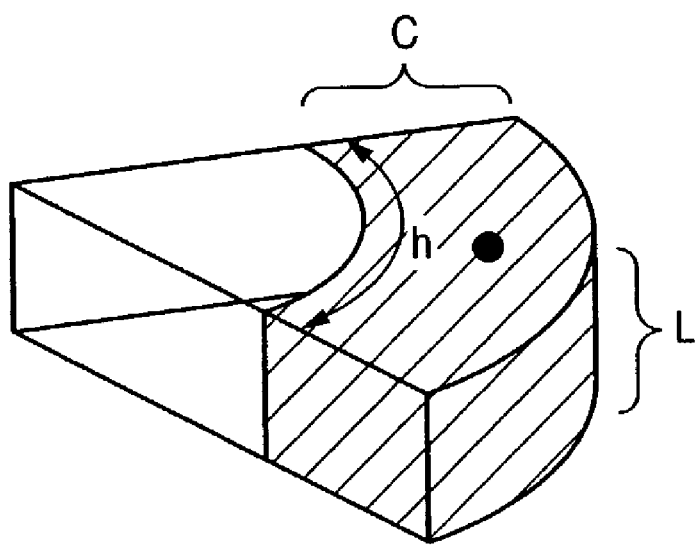
FIG. 16 shows the concept of gamut selection on a color space.

FIG. 16 shows the way the tuning range spreads in accordance with the set effect level on the Lab color space upon gamut selection. Referring to FIG. 16, ● indicates the coordinate position on the color space of the color to be tuned set by the mouse, and the fan-shaped tuning range is set in accordance with the set effect levels of L, C, and h to have this ● as the center.

Note that the range in which the effect level can be set ranges from 0 to 100 for an L value, from 0 to 128 for a C value, and from 0 to 360 for an h value. However, the present invention is not limited to these specific ranges.

In this manner, upon gamut selection, since the tuning range is set in a fan shape on the ab color space, tuning of the saturation or lightness of a specific hue does not influence other hues. That is, an identical hue region can be set as the tuning range.

Figure 17:
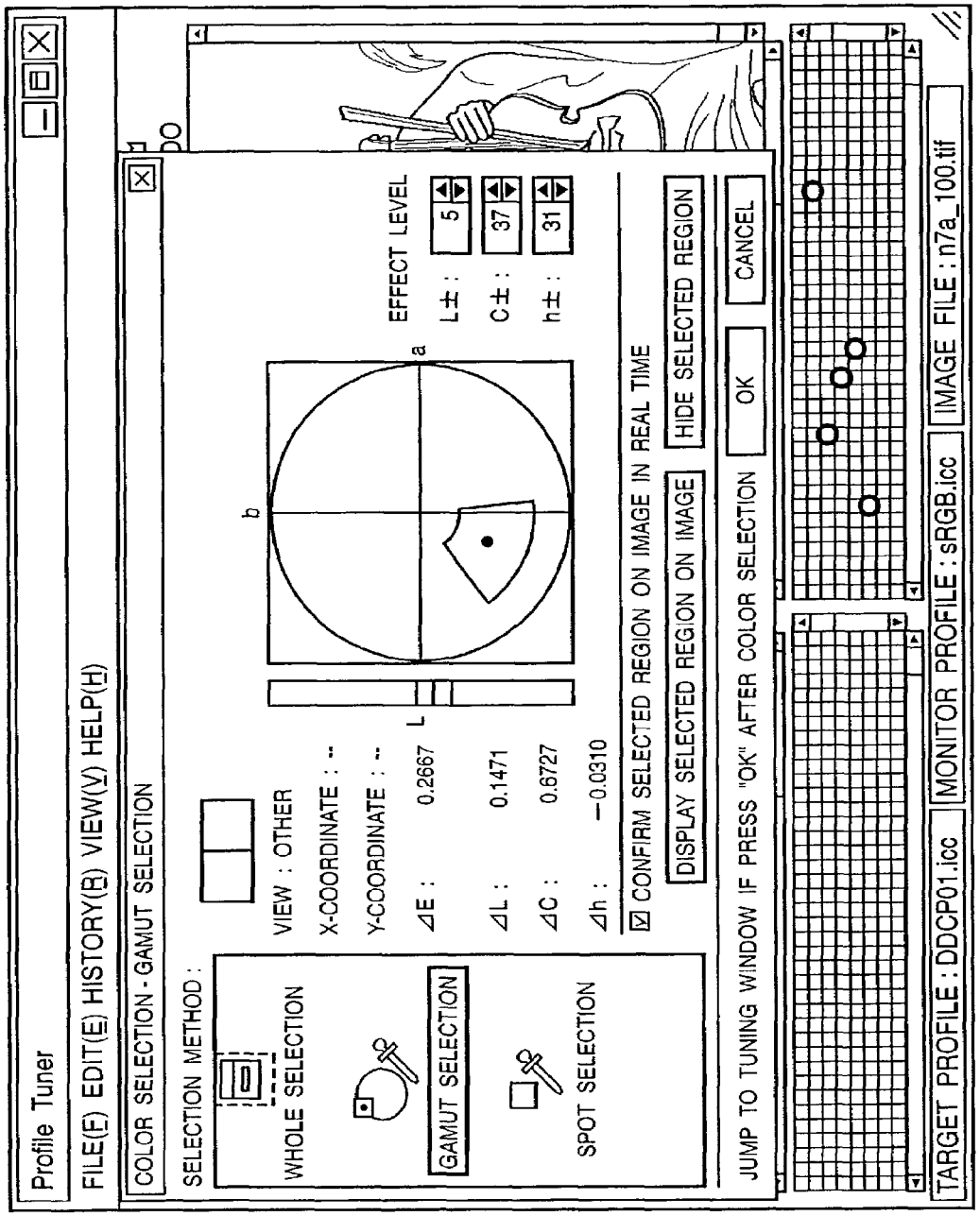
FIG. 17 shows a flickering state of the selected range.

If a "confirm selected region on image in real time" check box 2406 is checked, the selection result is fed back onto the preview image view and preview chart view in real time, and colors which fall within the set tuning range flash on these views. FIG. 17 shows this state. Referring to FIG. 17, hatched portions on the preview image view and colors with ○ on the preview chart view indicate colors falling within the selected tuning range, and these portions flash. Hence, the user can easily recognize the currently set tuning range. Note that the default of the check box 2406 is check OFF.

A function of a "display selected range on image" button is enabled when the check box 2406 is not checked, i.e., OFF. When this button is pressed, the selection result is fed back onto the preview image view and preview chart view, and colors that fall within the set tuning range flash. This button may be grayed out when the check box 2406 is ON.

Upon depression of a "hide selected region" button, the selection result is not displayed (does not flash) on the preview image view and preview chart view. (Upon depression of a "clear selection" button, the effect levels changed by the user are reset, and return to default values.) Upon depression of an "OK" button, a color tuning dialog (to be described later) is displayed.

In this manner, since colors that fall within the set tuning range flash on both the preview image view and preview chart view, a color which is not present on the preview image view can be designated and confirmed as the color to be tuned. Especially, when pre-set tuning contents are reflected in the current tuning image (image view) by a history function (to be described later), flashing display on the two views is effective.

Figure 18:
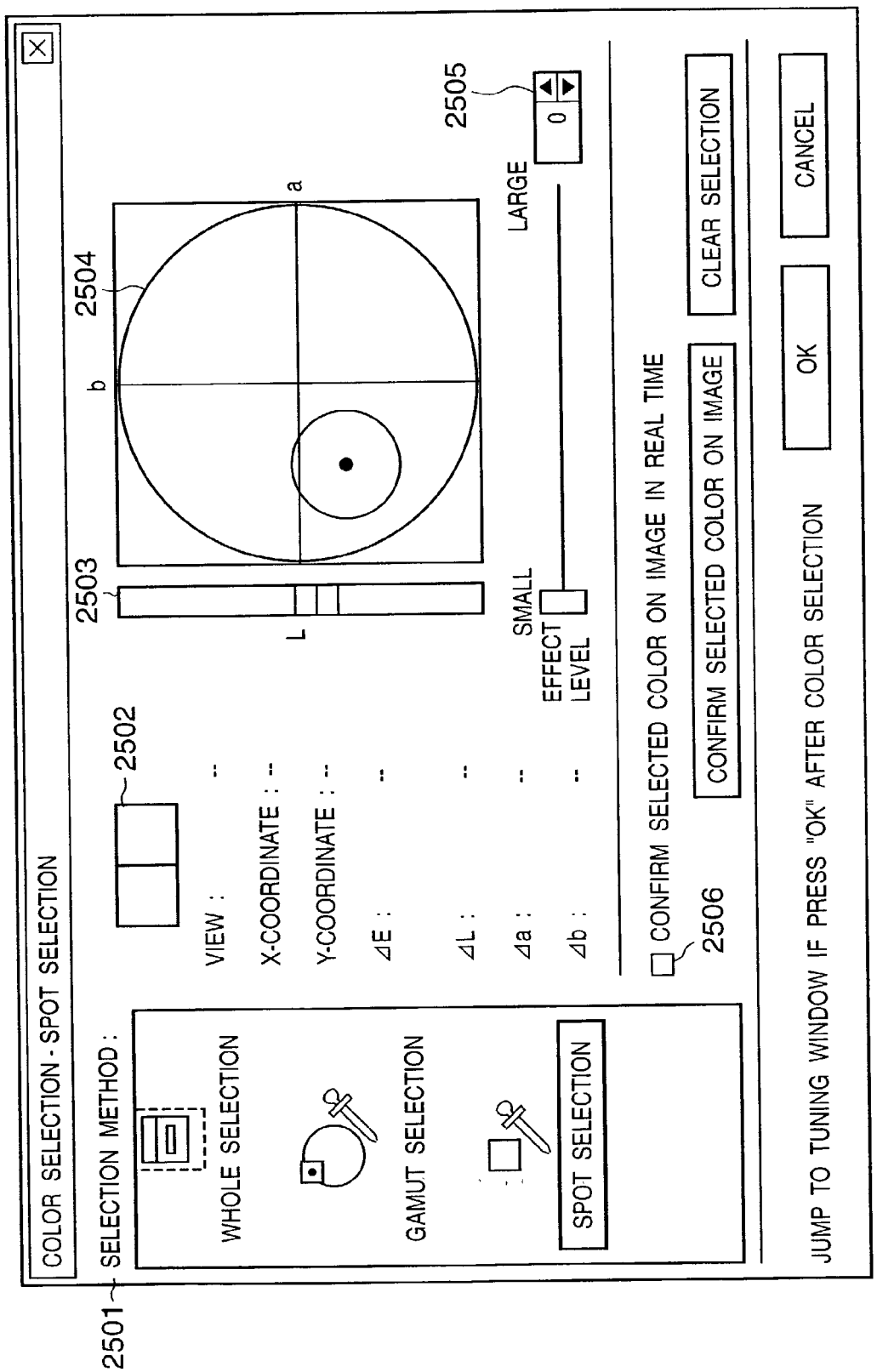
FIG. 18 shows an example of a spot selection dialog.

FIG. 18 shows a dialog when "spot selection" is set as a selection method 2501. "Spot selection" is a method of setting a spherical region having the color to be tuned (spot) designated by the mouse on the Lab color space as a range to be tuned. Note that a description of the same items in FIG. 18 as those in FIG. 15 will be omitted.

Referring to FIG. 18, reference numeral 2503 denotes an L point which displays the position of the color to be tuned on a color balance that indicates the degree of luminance. Reference numeral 2504 denotes an ab point, which displays the position of the color to be tuned on a color wheel expressed by ab color differences. Reference numeral 2505 denotes an item used to set the effect level of tuning. In case of spot selection, one effect level corresponding to the diameter of a sphere as the tuning range in the Lab color space is set.

On the spot selection dialog in FIG. 18, the color to be tuned is indicated by a dot on the color wheel indicating the ab point 2504, and a tuning range according to the effect level is displayed in a spherical shape to have that dot as the center. Likewise, the L point 2503 displays lines that indicate the tuning range according to the effect level above and below a line that indicates the color to be tuned.

Figure 19:
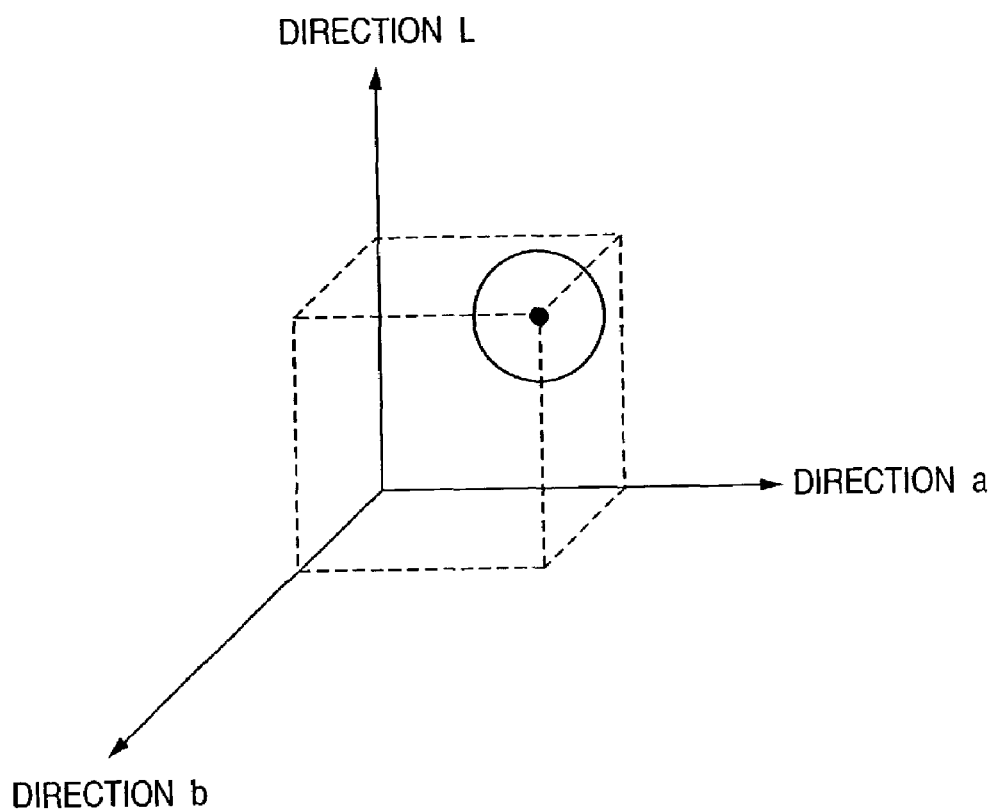
FIG. 19 shows the concept of spot selection on a color space.

FIG. 19 shows the way the tuning range spreads in accordance with the set effect level on the Lab color space upon spot selection. Referring to FIG. 19, ● indicates the coordinate position on the color space of the color to be tuned set by the mouse, and the spherical tuning range is set in accordance with the set effect level to have this ● as the center.

Note that the range in which the effect level can be set ranges, e.g., from 0 to 20, but the present invention is not limited to such specific range.

Figure 20:
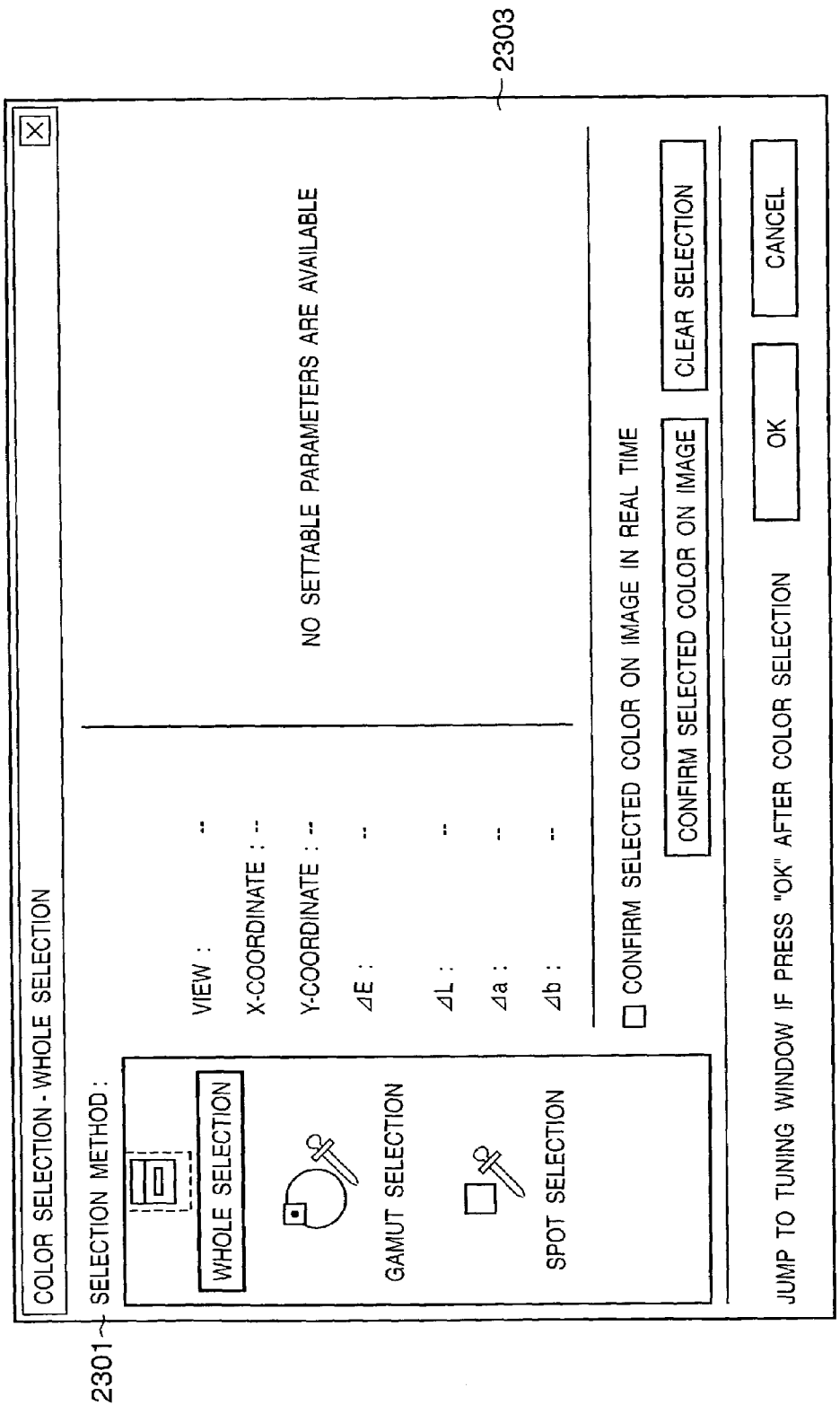
FIG. 20 shows an example of a whole selection dialog.

FIG. 20 shows a dialog when "whole selection" is set as a selection method 2301. "Whole selection" indicates that the whole image, i.e., the whole color space is set as an object to be tuned. Hence, if tuning is executed by "whole selection", no color to be tuned need be designated by the mouse on the preview window. Also, since no tuning range need be set, nothing is displayed on a control area 2303.

As described above, the user can select a desired one of a plurality of selection methods on the color selection dialog, resulting in high operability.

Color Tuning Dialog

When the user sets the tuning range on the color selection dialog and presses the OK button, as described above, a color tuning dialog used to set a tuning method for the set tuning range is displayed. The color tuning dialog will be described below.

The color tuning dialog includes a CMYK tuning dialog, Lab tuning dialog, and LCh tuning dialog depending on designation of its tuning method. Note that the default is, e.g., the CMYK tuning dialog.

FIG. 21 shows a dialog when "CMYK tuning" is selected as a tuning method 2801. Reference numeral 2802 denotes a color point, which displays preview and original colors to be tuned on the right and left fields as in the color selection dialog.

Reference numeral 2803 denotes areas used to tune the ratios of C, M, Y, and K. Each ratio can be set within the range from −20 to +20 to have 0 as a default value, but the present invention is not limited to such specific range.

If a "confirm tuning result on image in real time" check box 2804 is checked, the tuning result is fed back onto the preview image view and preview chart view in real time to update display. Note that the default of the check box 2804 is check OFF. If a "display selected color" check box 2805 is checked, colors that fall within the tuning range selected on the color selection dialog flash on the preview image view and preview chart view. Note that the default of the check box 2805 is check ON. The function of a "confirm tuning result on image" button is enabled when the check box 2804 is not checked, i.e., is OFF. Upon depression of this button, the profile is tuned on the basis of the set tuning values, and the tuning result is fed back onto the preview image view and preview chart view, thus updating display. This button may be grayed out when the check box 2804 is ON.

Upon depression of a "set weight" button, a weight setting dialog (to be described later) is displayed. Upon depression of a "reset" button, the tuning values changed by the user are reset and return to default values. Also, upon depression of an "OK" button, the tuning values are settled, and profile tuning ends.

Figure 22:
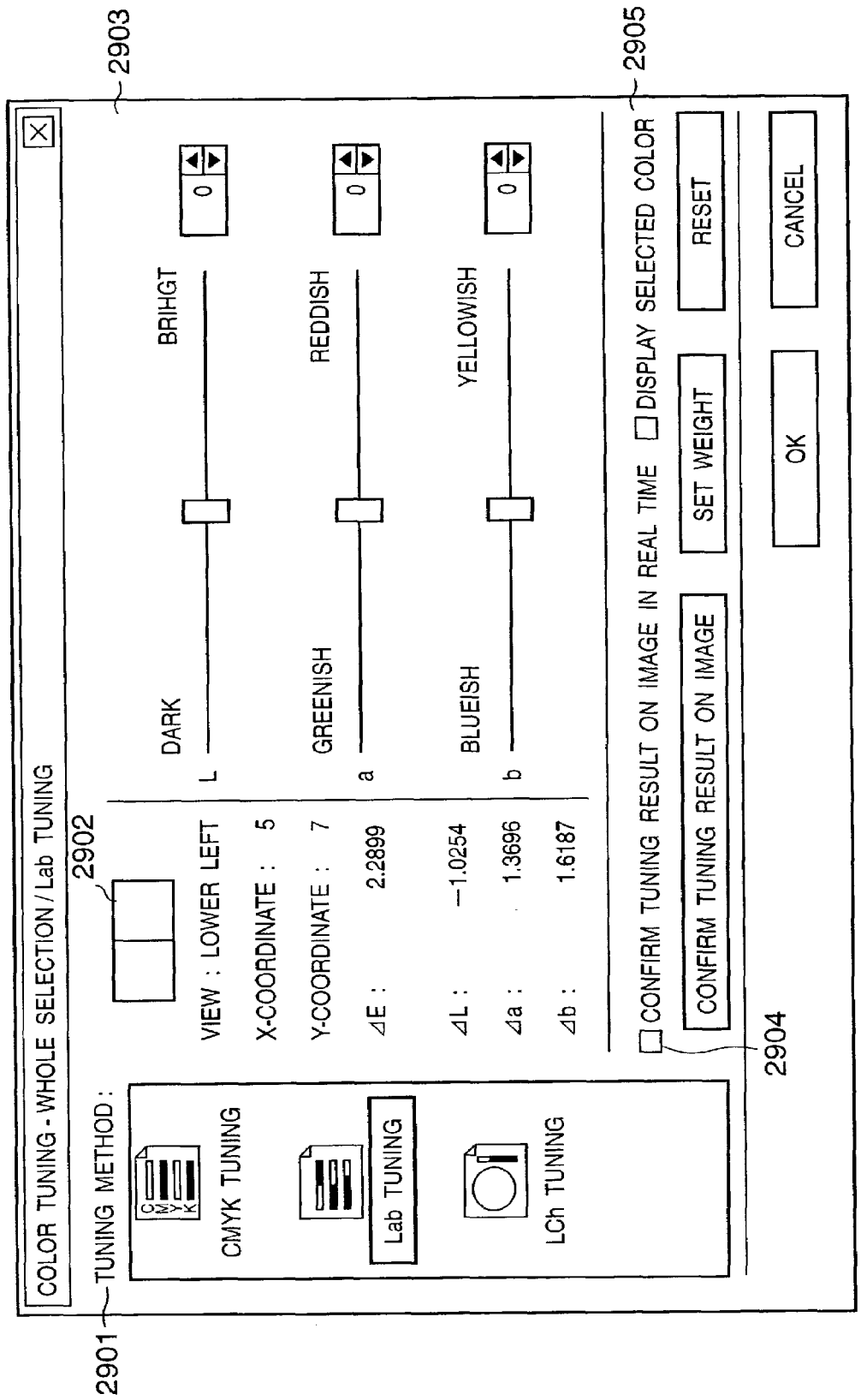
FIG. 22 shows an example of an Lab color tuning dialog.

FIG. 22 shows a dialog when "Lab tuning" is selected as a tuning method 2901. A description of the same items in FIG. 22 as those in FIG. 21 will be omitted. Reference numeral 2903 denotes areas used to tune the ratios of L, a, and b. Each ratio can be set within the range from −20 to +20 to have 0 as a default value, but the present invention is not limited to such specific range.

Figure 23:
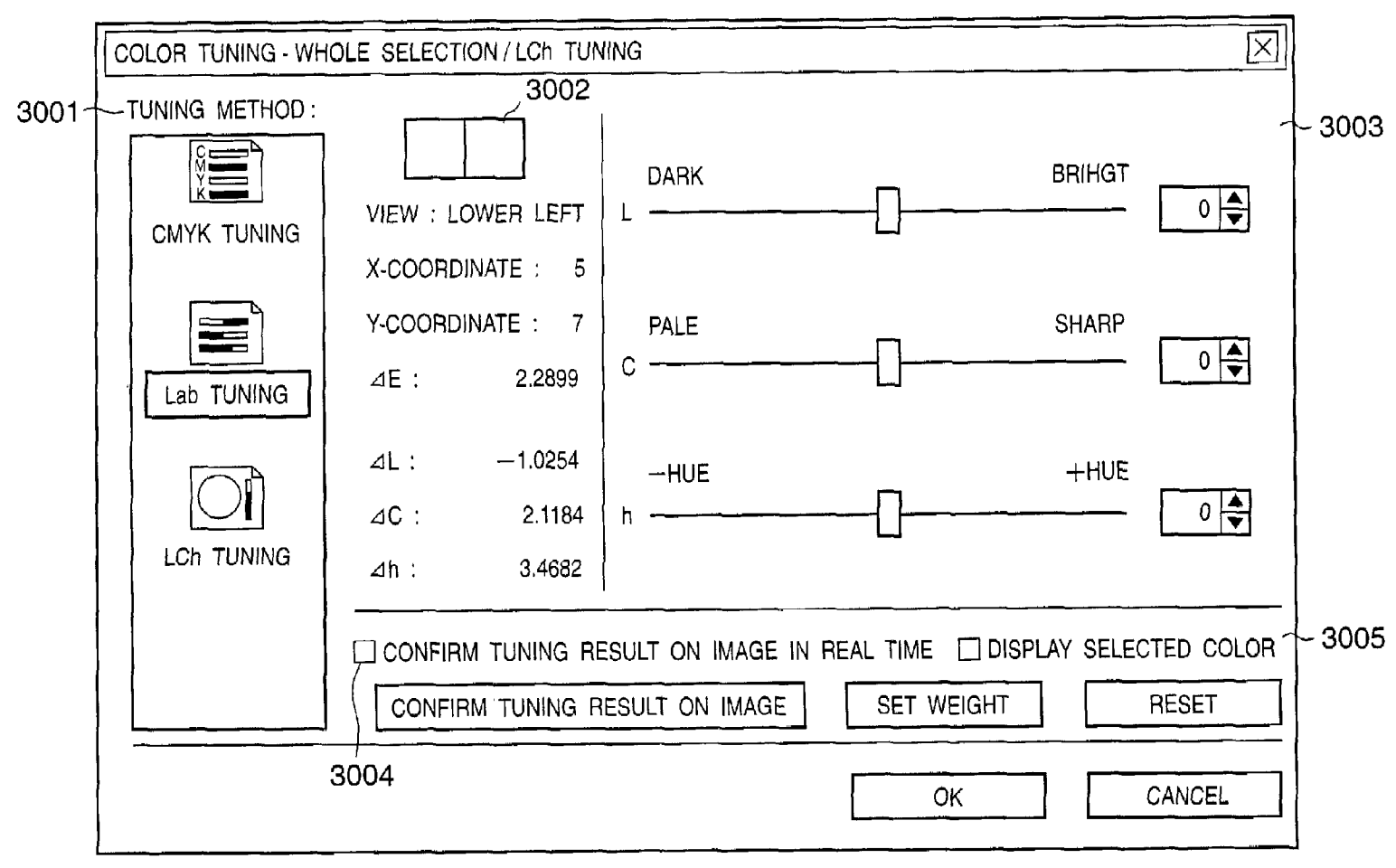

FIG. 23 shows a dialog when "LCh tuning" is selected as a tuning method 3001. A description of the same items in FIG. 23 as those in FIG. 21 will be omitted. Reference numeral 3003 denotes areas used to tune the ratios of L, C, and h. Each ratio can be set within the range from −20 to +20 to have 0 as a default value, but the present invention is not limited to such specific range.

Weight Setting Dialog

Figure 24:
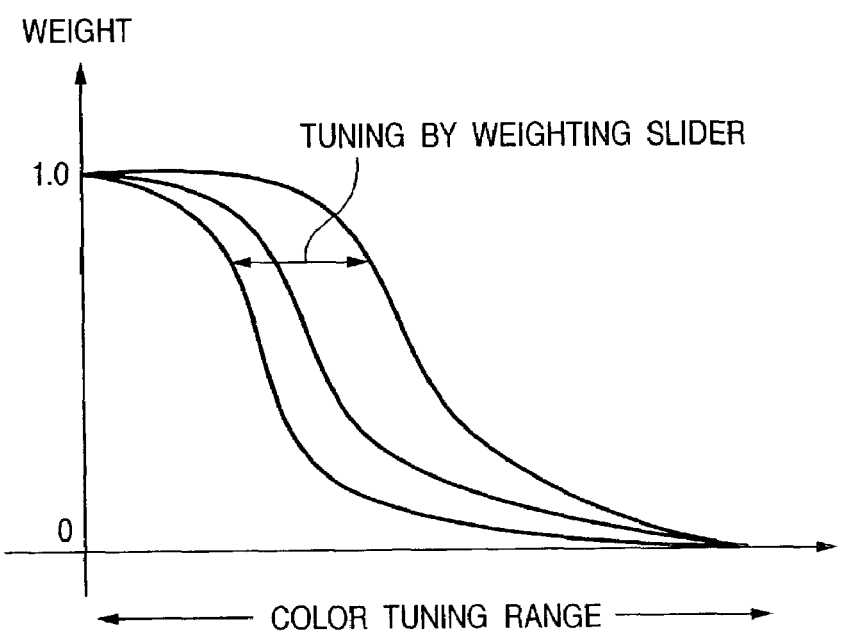
FIG. 24 shows a setup example of a weighting function.

A weight for the tuning value set using the color tuning dialog is set within the tuning range in the Lab color space set by the color selection dialog. This is to make the boundary of the tuning range indistinctive. More specifically, a weighting function is set in accordance with the set weight, as shown in FIG. 24.

As described above, upon depression of the "set weight" button on the color tuning dialog, a weight setting dialog is displayed. As the weight setting dialog, one of weight setting dialogs for whole selection, gamut selection, and spot selection is displayed depending on designation of the selection method on the color selection dialog.

Figure 25:
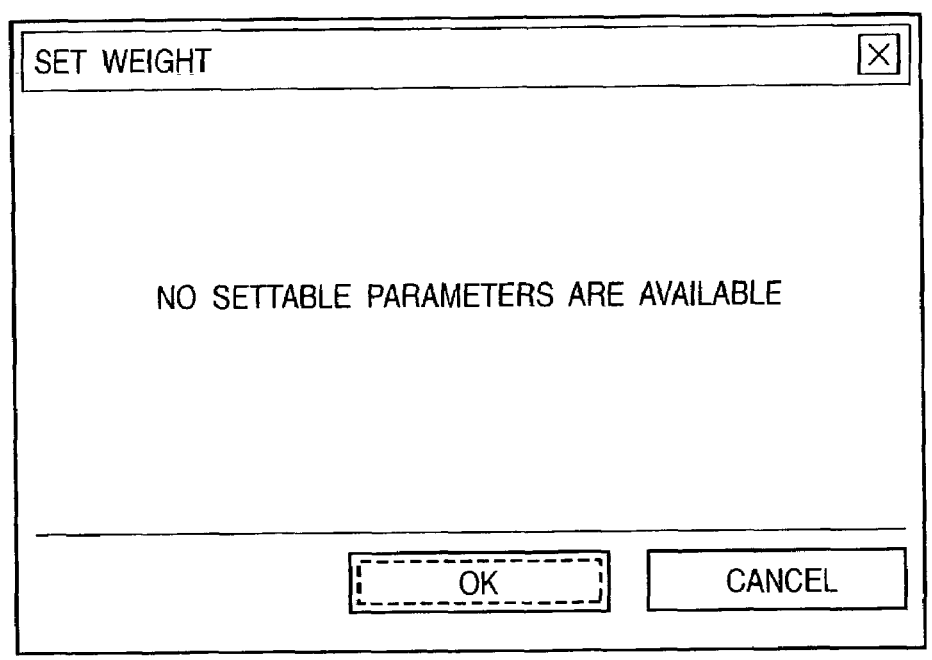
FIG. 25 shows an example of a weight setting dialog for whole selection.

FIG. 25 shows the weight setting dialog for whole selection, which is displayed when "whole selection" is set as the selection method on the color selection dialog. In case of whole selection, since no weighting is required, no parameters are set.

Figure 26:
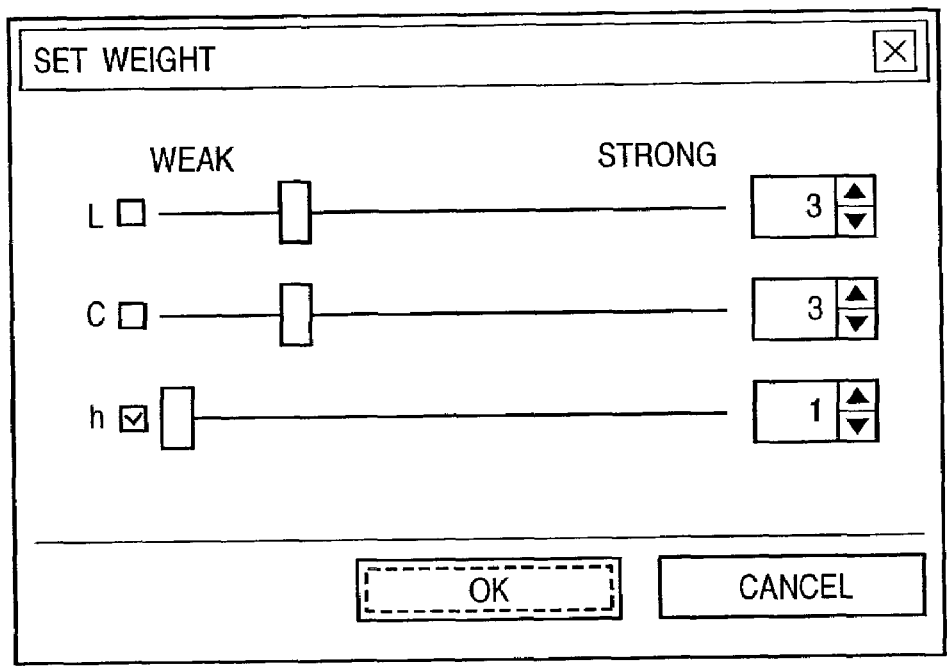
FIG. 26 shows an example of a weight setting dialog for gamut selection.

FIG. 26 shows the weight setting dialog for gamut selection, which is displayed when "gamut selection" is set as the selection method on the color selection dialog. As can be seen from FIG. 26, weights can be independently set for L, C, and h. Note that each weight can be set within the range from 1 to 10 to have 3 as a default, but the present invention is not limited to such specific range. Note that L, C, and H weight setting sliders respectively have check boxes, and are enabled only when the check boxes are checked. When the check box is not checked, a weight=1 is set. The tuning amounts on the Lab color space are calculated on the basis of the weights set for L, C, and H. In this case, for example, an LCh correction amount may be calculated from the corresponding weight setting functions, and can be converted into an Lab value.

Figure 27:
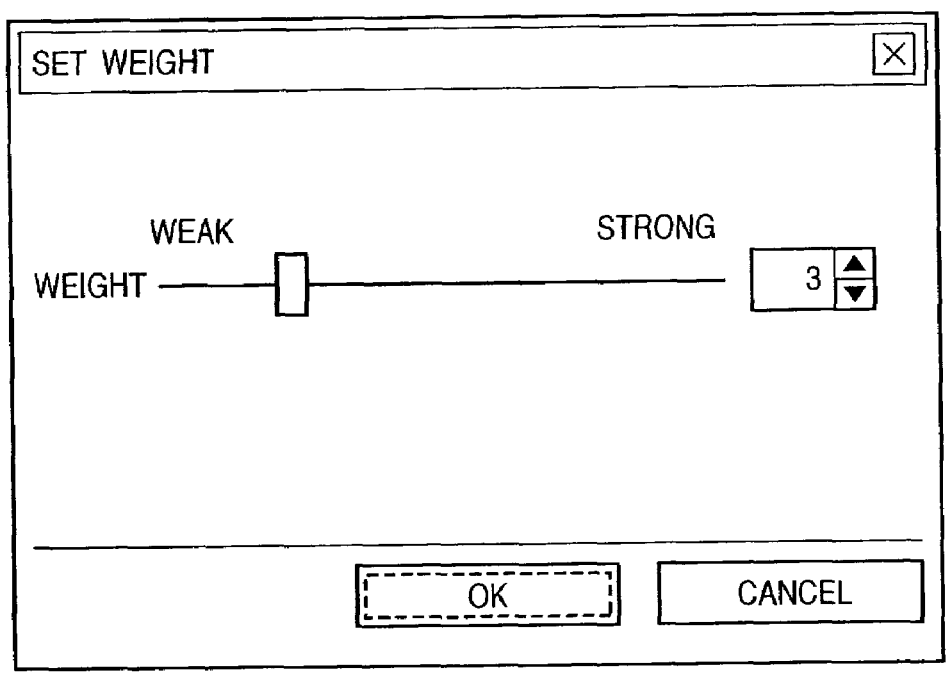
FIG. 27 shows an example of a weight setting dialog for spot selection.

FIG. 27 shows the weight setting dialog for spot selection, which is displayed when "spot selection" is set as the selection method on the color selection dialog. As shown in FIG. 27, only one weight can be set and, hence, one weighting function is set. The default of this weight is also 3, and the weight can be set within the range from 1 to 10. However, the present invention is not limited to such specific range.

Information Window

Figure 28:
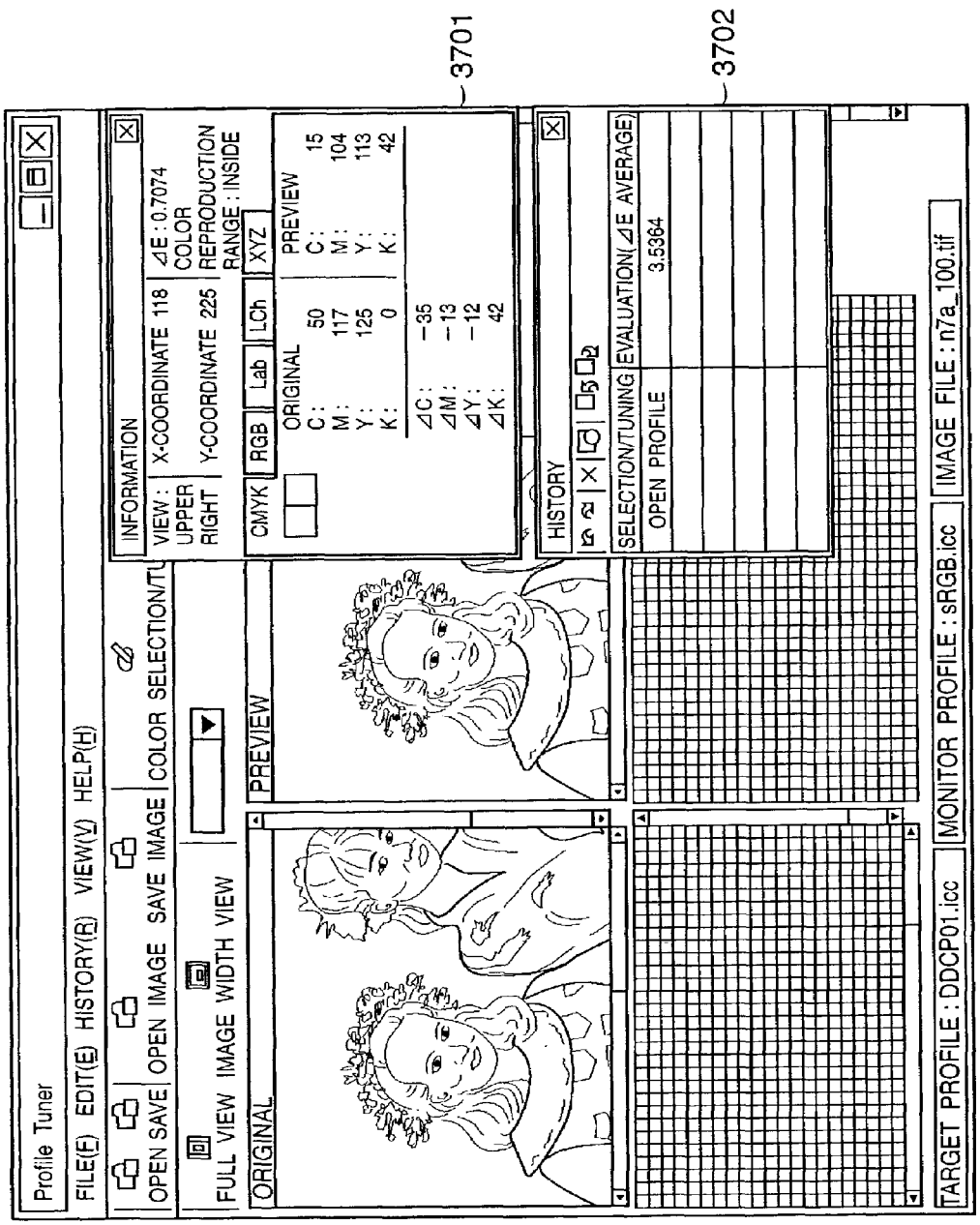
FIG. 28 shows an example of an information window and history window.

When the preview window shown in FIG. 14 is displayed for the first time, an information window 3701 that shows information of the currently displayed original and preview images is superposed, as shown in FIG. 28. The information window 3701 has display items "view", "X-coordinate", "Y-coordinate", and "ΔE" as in the gamut selection dialog shown in FIG. 15, and also an item "color reproduction range", which indicates whether all original image data (output from the target device profile 1102) falls within or outside the color reproduction range of the output device profile (1101D, 1101S). If this item is "outside", it is determined that the output device profile is inappropriate, and the profile tuning process can be started.

The information window 3701 has tag areas "CMYK", "RGB", "Lab", "LCh", and "XYZ", which display various kinds of color space information for the correctly selected color to be tuned. Note that the types of tags are not limited to this example.

History Window

As shown in FIG. 28, a history window 3702 is also superposed on the preview window. The history window 3702 displays a list of information of operations associated with the color selection/tuning process as a history every time such operation is made. Each history simultaneously displays an evaluation value of the tuning result. As the evaluation value, a ΔE average value, maximum/minimum value of ΔE, or the like can be used, but various other values may be used.

On the history window 3702, each history can be assigned a record name, and can be exported to the memory 1012. In this way, a process for undoing the current tuning (to return to a previous operation (previous tuning)) or redoing it during tuning can be made, and an arbitrary tuning stage can be easily reproduced. Also, by importing the history exported to the memory 1012 by designating its record name, it can be easily used upon tuning of another profile.

As described above, according to the fourth embodiment, the generation result of the output device profile 1101 can be easily confirmed, and tuning based on that result can be easily done.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, a profile that can accurately approximate strong nonlinear output characteristics of a color printer or printing press, and allows accurate color reproduction can be provided.

Also, whether or not the generated profile is appropriate can be confirmed, and the profile can be easily tuned.

Therefore, since color space conversion that well reflects the printer characteristics can be done in a device-independent color space, accurate printer color reproduction can be made irrespective of input color spaces. Also, since color separation suitable for the characteristics of an output device can be easily made, the color space conversion accuracy in a device-independent color space can be further improved.

The present invention is not limited to the above embodiments and various changes and modifications can be made within the spirit and scope of the present invention. Therefore, to apprise the public of the scope of the present invention, the following claims are made.

What is claimed is:

1. An image processing method to generate a first conversion condition used to convert a device-independent color signal into a device-dependent color signal, and a second conversion condition used to convert the device-dependent color signal into another device-independent color signal, based on the basis of colorimetric values of which are measured from color patches output by an output device, comprising the steps of:

inputting first and second image signals which depend on a target device, and converting the first and second image signals using a third conversion condition for the target device, the third conversion condition being a conversion condition that converts a color signal depending on the target device into a device-independent color signal;

displaying first and second preview images, which are respectively represented by image signals obtained by converting converted first and second image signals using the first conversion condition, and further converting the converted first and second image signals using the second conversion condition;

displaying first and second original images, which are respectively represented by the first and second image signals obtained by conversion using the third conversion condition;

inputting selection of an arbitrary color range to be tuned from either one of the displayed first preview image, the displayed second preview images, the displayed first original image, or the displayed second original image;

inputting tuning data to tune colors that are within the selected color range; and tuning the first and second conversion conditions based on the input tuning data, wherein the first preview image is a setting image which a user sets the tuning data, and the second preview image is a color chart image, and the selected color range is displayed on the first and second preview images so that the user can confirm the colors that are within the selected color range.

2. The method according to claim 1, wherein the user selects the color range by selecting one point corresponding to a color that the user wants to be tuned, on one of the first and second preview images and the first and second original images, and a tuning color range having that point as a center is set using a dialog.

3. The method according to claim 2, wherein the color range can be set as a fan-shaped region partitioned by a hue on a predetermined color range.

4. The method according to claim 3, wherein the fan-shaped region is set by designating saturation and lightness in an arbitrary hue.

5. The method according to claim 2, wherein the color range can be selected as a spherical region on a predetermined color space.

6. The method according to claim 2, wherein the predetermined color space is a Lab color space.

7. The method according to claim 1, wherein the color range can be selected as a whole range on a predetermined color space.

8. The method according to claim 1, wherein the tuning data is inputted for each of predetermined color components using a dialog.

9. The method according to claim 8, wherein the predetermined color components are one of CMYK, Lab, and LCh.

10. The method according to claim 8, wherein the tuning data is weighted in accordance with the color range to be tuned.

11. The method according to claim 8, wherein the tuning data can be set to reflect a tuning result based on the currently set tuning data in the first and second preview images in real time.

12. The method according to claim 1, further comprising the step of displaying image information before and after conversion using the first and second conversion conditions.

13. The method according to claim 1, further comprising the step of holding and displaying a history of tuning.

14. The method according to claim 13, wherein tuning at a selected arbitrary tuning timing in the displayed history can be made.

15. The method according to claim 1, wherein the first preview image and first original image, and the second preview image and second original image are respectively parallelly displayed.

16. The method according to claim 15, wherein zoom ratios of the first preview image and first original image, and the second preview image and second original image change synchronously.

17. The method according to claim 15, wherein the first preview image and first original image, and the second preview image and second original image move synchronously.

18. A computer-readable recording medium storing a program in executable form for causing a computer to perform the image processing method set forth in claim 1.

19. An image processing apparatus to generate a first conversion condition used to convert a device-independent color signal into a device-dependent color signal, and a second conversion condition used to convert the device-dependent color signal into another device-independent color signal, based on the basis of colorimetric values of which are measured form color patches output by an output device, comprising:

an input section, arranged to input first and second image signals which depend on a target device;

a first converter, arranged to convert the first and second image signals using a third conversion condition for the target device, the third conversion condition being a conversion condition that converts a color signal depending on the target device into a device-independent color signal;

a second converter, arranged to convert converted first and second image signals using the first conversion condition, and further converting the converted first and second image signals using the second conversion condition;

an output section, arranged to output to a monitor first and second original images, which are respectively represented by the first and second image signals obtained by said first converter, and first and second preview images, which are respectively represented by the first and second image signals obtained by said second converter;

a selector, arranged to select an arbitrary color range to be tuned from either one of the displayed first preview image, the displayed second preview image, the displayed first original image, or the displayed second original image;

an inputting section, arranged to input tuning data to tune colors that are within the selected color range; and a tuner, arrange to tune the first and second conversion conditions based on the input tuning data, wherein the first preview image is a setting image which a user sets the tuning data, and the second preview image is a color chart image, and the selected color range is displayed on the first and second preview images so that the user can confirm the colors that are within the selected color range.

* * * * *

UNITED STATES PATENT AND TRADEMARK OFFICE
CERTIFICATE OF CORRECTION

PATENT NO. : 7,385,739 B2
APPLICATION NO. : 10/238790
DATED : June 10, 2008
INVENTOR(S) : Manabu Ohga et al.

It is certified that error appears in the above-identified patent and that said Letters Patent is hereby corrected as shown below:

COLUMN 7:

Line 53, "correspond" should read --corresponds--; and
Line 57, "FIG. 12" should read --FIG. 12.--.

COLUMN 9:

Line 22, "101D)" should red --1101D)--.

COLUMN 13:

Line 27, "check" should read --checked--; and
Line 31, "check" should read --checked--.

COLUMN 16:

Line 17, "image," should read --images,--.

COLUMN 17:

Line 26, "the basis of" should be deleted; and
Line 27, "form" should read --from--.

UNITED STATES PATENT AND TRADEMARK OFFICE
CERTIFICATE OF CORRECTION

PATENT NO. : 7,385,739 B2
APPLICATION NO. : 10/238790
DATED : June 10, 2008
INVENTOR(S) : Manabu Ohga et al.

It is certified that error appears in the above-identified patent and that said Letters Patent is hereby corrected as shown below:

COLUMN 18:

Line 23, "arrange" should read --arranged--; and
Line 25, "which" should read --for which--.

Signed and Sealed this

Seventeenth Day of February, 2009

JOHN DOLL
*Acting Director of the United States Patent and Trademark Office*